US008812419B1

(12) United States Patent
Teller et al.

(10) Patent No.: US 8,812,419 B1
(45) Date of Patent: Aug. 19, 2014

(54) FEEDBACK SYSTEM

(75) Inventors: Eric Teller, San Francisco, CA (US);
Martin T. King, Vashon Island, WA (US); Cheryl Grunbock, legal representative, Vashon Island, WA (US); Claes-Fredrik Mannby, Mercer Island, WA (US); Kevin Anthony Furr, Vashon, WA (US)

(73) Assignee: Google Inc., Mountain View, CA (US)

( * ) Notice: Subject to any disclaimer, the term of this patent is extended or adjusted under 35 U.S.C. 154(b) by 467 days.

(21) Appl. No.: 13/158,305

(22) Filed: Jun. 10, 2011

Related U.S. Application Data

(60) Provisional application No. 61/354,190, filed on Jun. 12, 2010.

(51) Int. Cl.
*G06F 17/00* (2006.01)

(52) U.S. Cl.
USPC .......................................................... 706/46

(58) Field of Classification Search
USPC .......................................................... 706/12
See application file for complete search history.

(56) References Cited

U.S. PATENT DOCUMENTS

| | | | |
|---|---|---|---|
| 7,529,741 B2 * | 5/2009 | Aravamudan et al. ................. 1/1 |
| 2005/0055108 A1 * | 3/2005 | Gonzales et al. ............... 700/22 |
| 2006/0080408 A1 * | 4/2006 | Istvan et al. .................... 709/219 |
| 2006/0294036 A1 * | 12/2006 | Horvitz ............................ 706/45 |
| 2007/0016476 A1 * | 1/2007 | Hoffberg et al. ................. 705/14 |
| 2008/0004926 A1 * | 1/2008 | Horvitz et al. ..................... 705/7 |
| 2008/0005055 A1 * | 1/2008 | Horvitz ............................ 706/62 |
| 2008/0319727 A1 * | 12/2008 | Horvitz et al. .................. 703/13 |
| 2009/0076988 A1 * | 3/2009 | Stanelle .......................... 706/12 |
| 2010/0114803 A1 * | 5/2010 | Moon et al. ..................... 706/12 |
| 2010/0149073 A1 | 6/2010 | Chaum et al. |

OTHER PUBLICATIONS

Eric Horvitz, Paul Koch, Raman Sarin, Johnson Apacible, and Muru Subramani. 2005. Bayesphone: precomputation of context-sensitive policies for inquiry and action in mobile devices. In Proceedings of the 10th international conference on User Modeling (UM'05), Springer-Verlag, Berlin, Heidelberg, 251-260. 2005.*

* cited by examiner

*Primary Examiner* — Jeffrey A Gaffin
*Assistant Examiner* — David H Kim
(74) *Attorney, Agent, or Firm* — McDonnell Boehnen Hulbert & Berghoff LLP

(57) ABSTRACT

Exemplary methods and systems are disclosed that apply feedback-based machine learning in order to more intelligently use context information to automate certain actions. An exemplary method involves: determining a first context based on a combination of two or more context signals, using a context-to-action mapping to determine a first action that corresponds to the first context, initiating the first action, after initiating the first action, receiving a data signal corresponding to a user-action, analyzing the data signal to determine a feedback relationship between the user-action and the first action, and based at least in part on the feedback relationship, updating the context-to-action mapping.

43 Claims, 14 Drawing Sheets

FEEDBACK SYSTEM

CROSS REFERENCE TO RELATED APPLICATIONS

This application claims priority to U.S. Provisional Application No. 61/354,190, entitled "PROVIDING CONTENT BASED ON CONTEXT, SUCH AS AUDIO, VISUALS, LOCATION, INTERESTS, HISTORY", filed on Jun. 12, 2010, which is herein incorporated by reference for all purposes.

BACKGROUND

In the past, publishing content has mainly involved creating content that is then found and retrieved by users. With the pervasiveness of devices such as smart cell phones with microphones, location services (such as GPS-based location services), cameras, connectivity to the Internet, extensive memory and processing capabilities, etc., it is now possible to create content and make it available to users based on their extended context, such as their auditory environment (words, music, noise, sounds, etc.); visual environment (scenes, buildings, people, etc.); environment such as temperature, weather, humidity, climate, etc.; their bodily state (temperature, heart rate, wakefulness, sweating, etc.); their location; related events, such as proximate events in time and space or conceptually related events; related objects, such as conceptually related objects, or proximate buildings, businesses, historical sites, exhibits, sports events, players, field positions, etc.; related people, such as a person's social network, proximate people, etc., and such people's context; the direction they are facing; their posture, gestures, direction and sequence of gaze, etc.; their direction and speed of travel; their past contexts; their projected future contexts; their past, current and projected interactions with electronic systems, including the system described herein; their implicit and explicit interests and preferences; etc.

SUMMARY

Exemplary methods and systems are disclosed that may help to apply feedback-based machine learning in order to more intelligently use context information to automate certain actions.

In one aspect, an exemplary computer-implemented method involves: (i) determining a first context signal; (ii) determining a second context signal; (iii) determining, at a computing device, a first context based on a combination of two or more context signals, the two or more context signals including the first context signal and the second context signal; (iv) using a context-to-action mapping to determine a first action that corresponds to the first context, wherein the context-to-action mapping maps a plurality of contexts to a plurality of corresponding actions such that the first context maps to the first action; (v) initiating the first action; (vi) after initiating the first action, receiving a data signal corresponding to a user-action; (vii) analyzing the data signal to determine a feedback relationship between the user-action and the first action; and (viii) based at least in part on the feedback relationship, updating the context-to-action mapping.

In another aspect, an exemplary computer-implemented method involves: (i) detecting at least one context signal; (ii) determining, at a computing device, a first context based on the at least one context signal; (iii) using a context-to-action mapping to determine a first action that corresponds to the first context, wherein the context-to-action mapping maps a plurality of contexts to a plurality of corresponding actions such that the at least one context signal maps to the first action; (iv) initiating the first action; (v) after initiating the first action, receiving a data signal corresponding to a user-action; (vi) analyzing the data signal to determine a feedback relationship between the user-action and the first action, wherein the feedback relationship indicates a desirability difference between the initiation of the first action and one or more previous initiations of the first action in a substantially same context; (vii) responsive to the feedback, determining one or more context signals that have a likelihood of reconciling the desirability difference between the initiation of the first action and one or more previous initiations of the first action in a substantially same context; and (viii) updating the context-to-action mapping to indicate that the first context should be determined based on both: (a) the at least one context signal and (b) the one or more context signals that have a likelihood of reconciling the desirability difference.

In an additional aspect, an exemplary system includes a non-transitory computer-readable medium and program instructions stored on the non-transitory computer-readable medium and executable by at least one processor to: (i) determine a first context based on a combination of two or more context signals, the two or more context signals including a first context signal and a second context signal; (ii) use a context-to-action mapping to determine a first action that corresponds to the first context, wherein the context-to-action mapping maps a plurality of contexts to a plurality of corresponding actions such that the first context maps to the first action; (iii) initiate the first action; (iv) after initiating the first action, receive a data signal corresponding to a user-action; (v) analyze the data signal to determine a feedback relationship between the user-action and the first action; and (vi) based at least in part on the feedback relationship, update the context-to-action mapping.

In yet another aspect, an exemplary system includes: (i) a means for determining a first context based on a combination of two or more context signals; (ii) a means for using a context-to-action mapping to determine a first action that corresponds to the first context, wherein the context-to-action mapping maps a plurality of contexts to a plurality of corresponding home-automation actions, such that the first context maps to the first action; (iii) a means for initiating the first action; (iv) a means for, after initiating the first action, receiving a data signal corresponding to a user-action; (v) a means for, analyzing the data signal to determine a feedback relationship between the user-action and the first action; and (vi) a means for, based at least in part on the feedback relationship, updating the context-to-action mapping.

These as well as other aspects, advantages, and alternatives, will become apparent to those of ordinary skill in the art by reading the following detailed description, with reference where appropriate to the accompanying drawings.

DETAILED DESCRIPTION

Figure 1:
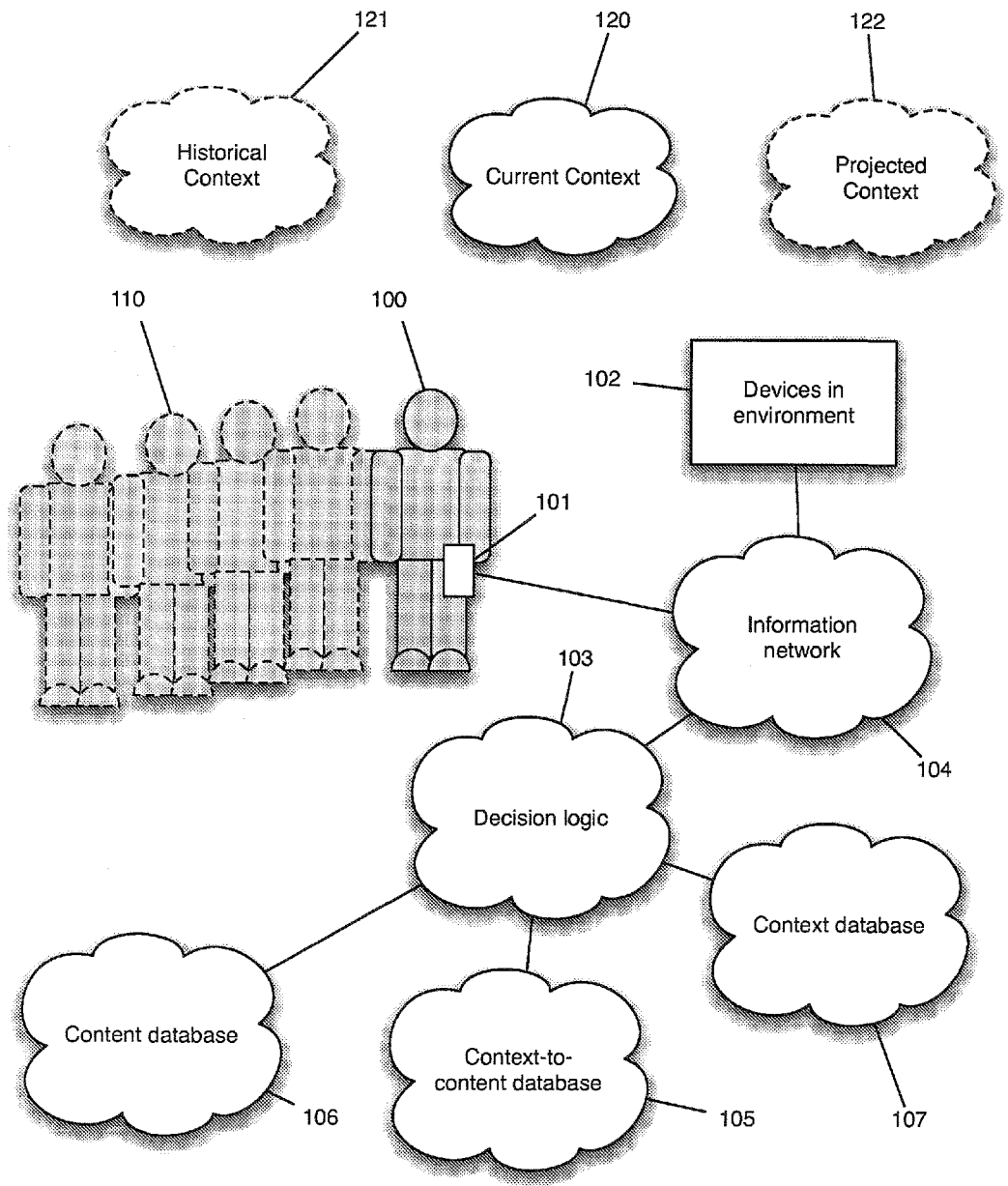
FIG. 1 is a component diagram showing an embodiment of the current invention.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

A system and method for providing content, such as audio-visual content, based on a person's context is described. In some embodiments, a portable device, such as a smart cellphone, may perform the function of collecting some of the contextual information used by the system, and may perform the function of providing some of the content identified by the system to the person. In some embodiments, networked resources such as databases and processing resources on the Internet are used to collect contextual information, analyze it, map it to potential content, and provide the content to the portable device. In some embodiments, other input methods are used, such as sensors in the person's environment, and other output methods are used, such as displays, speakers, etc. in the person's environment.

In some embodiments of the system, online video databases may be used to store content such as audio-visual content, and in some embodiments, such an online database may store both a video file and an audio file, and may store an association between the two, such that the video file can be presented to a person by the system when the audio content is detected in the person's auditory environment. In some embodiments, such associations are made automatically. In some embodiments, such associations are made manually/explicitly.

In some embodiments of the system, content such as audio-visual content is presented to a person based on the person's geographical location, such as a town square, a place of commerce, a sports stadium, an exhibit, etc.; based on a specific place within such a location; based on a combination of a place and other contextual information, etc.

In some embodiments of the system, a significant portion of a person's context is derived from the audio signal, digital data signal, the identity or identities (e.g. phone numbers) of one or more connected entities, etc., of the person's audio communication device, such as a cell phone. In some embodiments, the system may present the person with content such as audio-visual content based on a "hold" message, music, etc., transmitted, e.g. by a person, an institution, a business, etc.

In some embodiments, the system may automatically or optionally connect the person to other persons through other communication channels, such as textual, audio, audio-visual and/or other chat sessions, based on the context of one or more of the persons involved. In some embodiments, such connections can be made based on the audio, video, text and/or other data or metadata being communicated in or is available about a phone, voice-over-IP ("VOIP"), or other communication "call."

In some embodiments, special network communication services are provided by the system to provide the content such as audio-visual content to a person. In some embodiments, a person carries a portable device, such as a smart cellphone, with communication capabilities, and the smart cell phone provides information to other devices, such as other smart cell phones, computers, network base stations, cell phone towers, etc. about, for example, the content that (a) the person is currently being provided with, and/or (b) the person's portable device is relaying to other devices. In some embodiments, the system uses this information to route the content to networked devices, especially in cases where the use of networked devices is geographically dense, such that it is difficult for traditional networks to service all the networked devices.

In some embodiments, a stationary or semi-portable device, such as a corded or cordless phone, a VOIP phone, a personal computer (e.g. with a headset), a laptop, a picture frame, a display, etc. are used instead or in conjunction with a portable device such as a smart cell phone.

Although not required, aspects of the system are described as taking the form of computer-executable instructions (e.g., program instructions stored on a non-transitory computer readable medium), such as routines executed by a general-purpose data processing device, e.g., a server computer, wireless device, mobile phone or personal computer. Those skilled in the relevant art will appreciate that aspects of the system can be practiced with other communications, data processing, or computer system configurations, including: Internet appliances, hand-held devices (including personal digital assistants (PDAs>>, all manner of cellular or mobile phones, telecommunications or mobile devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable storage media, including magnetically or optically readable computer discs, hard-wired or preprogrammed chips (e.g., EEPROM semiconductor chips), secure memory, nanotechnology memory, biological memory, or other data storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

In some embodiments of the system, context is determined by collecting and analyzing information from services provided by devices near a person, such as a phone, computer, display, etc.; portable devices, such as cellphones, PDAs, tablets, game devices, laptops, computers, displays, picture frames; distant devices, such as monitoring stations, satellites, etc. In some embodiments, context is collected, stored, retrieved, analyzed, etc. locally, in a distributed fashion, at a distant location, etc. In some embodiments, historical contextual data and/or the result of analysis is stored and retrieved locally, in a distributed fashion, at a distant location, etc. In some embodiments, context is collected, stored, retrieved, analyzed, used, etc. per person, per role, per category of person, per category of location, temperature, orientation, etc. or any combination of attributes involved in the contextual data or its collection, analysis and determination. In some embodiments, context is predicted using one or more prediction schemes, such as extrapolation (e.g. when a person is driving or walking along a route) and more sophisticated machine-learning prediction schemes (e.g. involving clustering, k-nearest neighbor analysis, linear regression, singular vector decomposition, principal component analysis, neural networks, restricted Boltzmann Machines, Hidden Markov Models, Bayesian statistics, genetic algorithms, etc.).

In some embodiments, the system may make use of human labor to assist in determining appropriate weighting of the importance of aspects of the context, the selection of aspects to consider, and/or in the selection of content to provide, etc. In some embodiments, any aspect of the system may be supplemented by human labor.

In some embodiments, the system may make use of any of the type of context data including: (i) data related to an auditory environment (words, music, noise, sounds, etc.), (ii) data related to a visual environment (scenes, buildings, people, etc.), (iii) environmental data such as temperature, weather, humidity, climate, etc., (iv) data related to bodily state (temperature, heart rate, wakefulness, sweating, etc.), (v) location data, (vi) the direction a person is facing, (vii) a person's posture, gestures, direction and sequence of gaze, etc., (viii) a person's direction and/or speed of travel, (ix) a person's past, current and/or projected interactions with electronic systems, including the system described herein, (x) a person's implicit and explicit interests and preferences, (xi) historical data for a person, other persons, groups of persons, etc., and (xii) data related to any attribute or combination of attributes for any person or combination of persons, etc.

Further, an exemplary system may make use of related context data, such as: (i) related events, such as proximate events in time and space, or conceptually related events, people, locations, objects, etc., such as previous visitors, architects, funders, disasters, sister cities, interaction sequences (e.g. common paths traveled or interacted with), etc., (ii) related objects, such as conceptually related objects or proximate buildings, businesses, historical sites, exhibits, sports events, players, field positions, etc., and (iii) related people, such as a person's social network, proximate people, people related to a location or event, etc., and such people's context.

The system may make use of the context of aspects of the context recursively, such as the context of all other people from a certain country who visit a certain place in this country, for example, or other useful navigations in the graph of data and relationships. For example, the system may take as part of a person's context, the context of all people who have a similar purchase history who also passed through a location on a day with similar weather. This may, for example, enable the system to predict well received, relevant and successful advertising for a refreshing drink.

Choice of Content to Provide

In some embodiments, the system may automatically, or with the assistance of human labor, generate a prioritized or weighted list of content to provide to a person or group of persons.

In some embodiments, more than one item from the prioritized or weighted list may be combined and presented in combination or sequence to a person or group of persons.

In some embodiments, the system may automatically choose a single item from the prioritized or weighted list to present to a person or group of persons.

In some embodiments, the system may allow a person or group of persons to explicitly choose one or more items from the prioritized or weighted list.

In some embodiments, the system may allow a person or group of persons to implicitly choose one or more items from the prioritized or weighted list indirectly, by providing additional context, e.g. first prompting for more context. Such prompting may, for example, take the form of explicit questions or options for selection of answers or preferences, or may, for example, take the form of delayed presentation of content until more context is available, or may, for example, take the form of vague exploration of preferences, by, for example, allowing the person to navigate a somewhat continuous space of likes and dislikes.

Multiparty Channels

In some embodiments, the system may present "channels" to a person, such as chat sessions, based on the person or group of persons' context.

In some embodiments, the system may allow a person to request a "channel," to one or more other persons, e.g. based on location, interests, demographics, sports interests, etc.

Interaction with Other Parties, Vendors, Advertisers

Games, Competitions, Participation

In some embodiments, the system may provide games, competitions, and other forms of participation in an event or a session with two or more parties. Such participation may, for example, be synchronous (e.g. all parties are actively engaged in the participation at the same time), or asynchronous (e.g. at least some parties participate at different times).

In some embodiments, persons watching a sports game, for example, or experiencing an exhibit, may play games, such as, for example, games designed to experience various aspects of a sports game or exhibit; they may compete against each other, for real or virtual prizes, e.g. by guessing the number of points scored, number of fouls, most valuable player, etc.; they may participate in polls, encouragement, derision, etc., may make suggestions, point out mistakes or errors, point out good, correct or laudable actions, may translate parts of the event, may capture audio, video, textual notes, etc. from the event, etc.

Advertising

In some embodiments, the system may provide advertising, such as, for example, advertising targeted specifically to a person or group of person's context.

In some embodiments, the advertising may be the focus of the content presented to a person or group of persons, or may be only a direct or indirect part of the content.

In some embodiments, a person or group of persons may need to request advertising in order to see advertising.

In some embodiments, the system may be free of charge if the system is allowed to show advertising to a person or group of persons, and may charge persons if no advertising is allowed. In some embodiments, charges to a person are reduced by viewing, interacting with, performing financial transactions based on the advertising, etc.

Commerce

In some embodiments, the system connects a person to commercial opportunities, such as, for example, concession items at a sports event.

In some embodiments, a person may register their location, e.g. their seat identifier (such as a row and seat number) at a sports event.

In some embodiments, a person may pay electronically using the system, or using another electronic system.

In some embodiments, a person may accumulate charges, and pay for commercial transactions at a later time, such as at the time of exit from an event.

In some embodiments, a person may declare a preferred form of payment, such as cash, credit card, etc., may declare required change or bills available, etc.

In some embodiments, a person may pay or offer to pay for goods or services received or to be received by other persons, e.g. other people rooting for the same team, people who are sitting nearby, people with certain demographics (e.g. gender), with similar tastes, etc.

In some embodiments, a person may declare a favorite team, favorite players, guessed scores, events, most-valuable-player, etc.

Sources of Content

In some embodiments, the system may use content, such as audio, video, text, and other content, from users of the system.

In some embodiments of the system, a person attending a car race, for example, may capture audio, still pictures, video, comments, etc. of the race, in real-time or asynchronously. In some embodiments, such "individually-sourced" and/or "crowd-sourced" content is used in real-time and/or asynchronously as content for the same or other persons.

In some embodiments, persons creating content are paid, or their charges reduced, based on created content, based on the amount of use of their content, on feedback on their content, etc.

In some embodiments of the system, content captured by a person is used to gain an accumulated, historical perspective on an event, location, person, etc. For example, in some embodiments, a person may capture a video of the view from a car driving through a city.

In some embodiments, a service may provide data to a computing system associated with a person, and the computing system may compare the data to data generated by analyzing e.g. a video captured by the person, and may, for example, highlight significant changes. In some embodiments, the significant changes may be provided to the service, which may this way acquire an often-updated stream of data on some subject, such as, for example, a "street view" of a neighborhood that is updated daily, hourly, or even more frequently, for example. A person providing such content and/or data processing may receive money or other benefits from doing so.

Transmission of Content

In some embodiments, the system uses established communication networks, such as wired, WiFi, cellular, satellite, Zig Bee, radio frequency (RF), laser, infrared (IR), ultrasound, etc., networks, to deliver content to users.

In some embodiments, the system uses networks, such as ad-hoc networks, between users of the system to enhance established communication networks. For example, in a location such as a sports stadium, with a high density of wireless devices such as cell phones, tablets and laptops, the system may make use of the mutual communication abilities of the devices to enhance the ability of the system to deliver content, especially high-bandwidth audio-visual content, to devices that are part of the system.

For example, a person's device may transmit an identifier or description of its context or one or more desired channels of content. A person's device may also transmit an identifier for channels that it has, is currently, or will retransmit. The system may then, for example, decide which devices to transmit data through to allow many people to experience the appropriate channels of content.

Such a "mesh network" may change transmission patterns quickly and dynamically, e.g. based on blow-by-blow events taking place in a sporting event, based on bandwidth needs, capabilities, and history, and, e.g. based on source content being generated by devices in the system, which may also be at the same event.

Referring to FIG. 1, in some embodiments of the system, a person 100 (with historical presences 110) may carry a portable device such as a smart cellphone, 101. The portable device may detect some of the person's context 120, e.g. by use of microphones, cameras, GPS, WiFi, Bluetooth, ZigBee, RF (radio frequency signals), IR (infrared sensors), gyroscopes, compasses, accelerometers, pressure sensors, temperature sensors, humidity sensors, stored data, analyzed data, communication with an information network 104, such as the Internet, a LAN, WAN, etc. The portable device 101 and/or the information network 104, in some combination, may store, retrieve, analyze, predict, etc., the person's historical context 121, projected, future context 122, current context 120, based on information on the portable device 101 and/or the information network 104. In some embodiments, additional devices 102 may exist in the person's environment, and be used to collect contextual information about the person, the environment, other persons, etc. Additional devices 102 may also be used to present content such as audio-visual material provided by the system, instead of or in conjunction with the portable device 101

The information network 104, may also contain specific services such as a content database 106, which may store content such as audio-visual material, a context-to-content database 105, which may store mapping information relating content to contexts, a context database 107, which may store current, historical and projected context data and context analyses for the person (and/or other persons), and/or a decision logic service 103, which may make decisions about what data to store, which context-to-content mappings to prioritize and/or weight, and ultimately what content to provide to the person. In this document, the information network 104 should be understood to subsume portable devices 101, devices in the environment 102, as well as the various services such as 103, 105, 106 and 107. Services described as being in the information network 104 may be in any combination of devices and networks. E.g., the entire system may exist on a person's portable device 101, only in the information network 104 and devices in the environment 102, or any combination of devices and networks.

Figure 2:
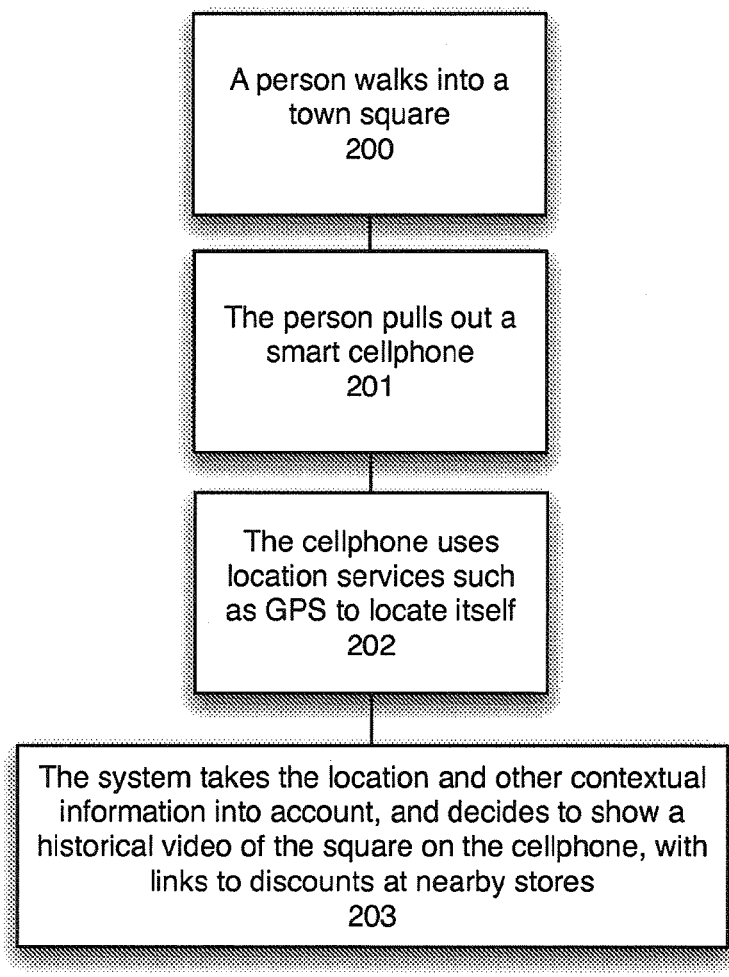
FIGS. 2-7 are flow diagrams showing various embodiments of the current

Referring to FIG. 2, in some embodiments, a person may walk into a town square, such as Westlake Plaza in Seattle, or Piazza Navona in Rome, in step 200. The person may pull out a smart cell phone in step 201, and the cell phone may use location services such as GPS to determine the person's location in step 202. In step 203, the system may take the location and other contextual information, such as interests, time spent watching or interacting with presented content such as audio-visual material, weather, orientation, the person's stress level, surrounding noise, etc., and decide to show a historical video of the square on the cell phone, with links to discounts at nearby stores, such as a half-priced coffee in an outdoor cafe.

Figure 3:
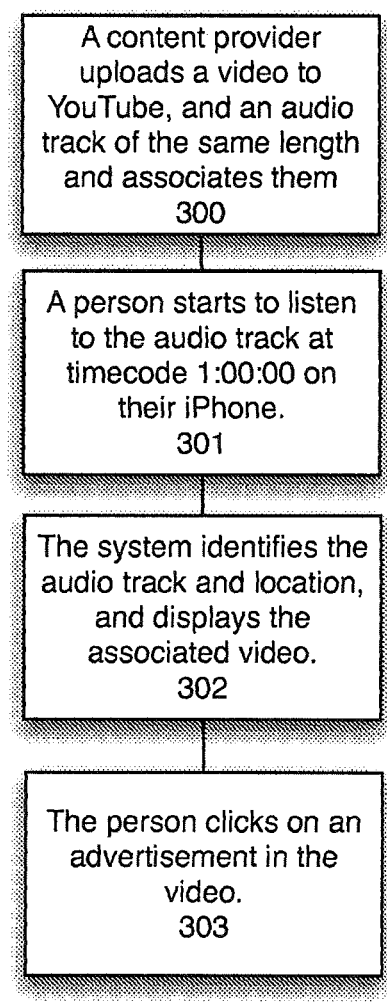

Referring to FIG. 3, in some embodiments, a content provider, such as a music studio, a movie studio, a satirist, a hobbyist, etc., may upload a video to an online video database, as well as one or more audio tracks, e.g. of the same length, in step 300. The content provider or other person may further associate the audio tracks and the video, e.g. mapping time codes between them, such as for them to run at the same speed. A person may start to listen to one of the audio tracks on a device in step 301. In step 302, the system identifies the audio track and timecode within the audio track, and may display the associated video at the matching timecode. In step 303, the person may click on an advertisement associated with the video, and make a purchase.

Figure 4:
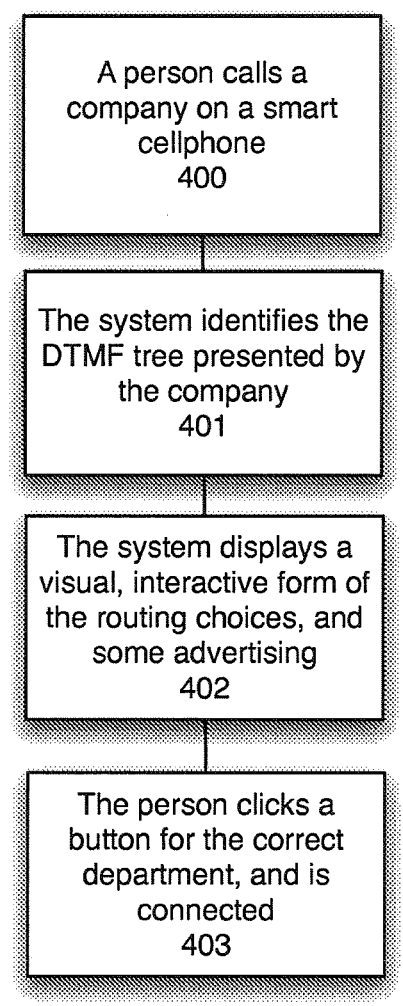

Referring to FIG. 4, in some embodiments, a person may call a company on a smart cellphone in step 400. The system may identify the DTMF tree or other menu system presented as audio by the company in step 401. In step 402, the system may display a visual, interactive form of the menu system (e.g. with routing choices), optionally with some advertising, that may take the person's and/or the company's context into account. In step 403, the person may click a button to select the desired department to be connected to, and is connected.

Figure 5:
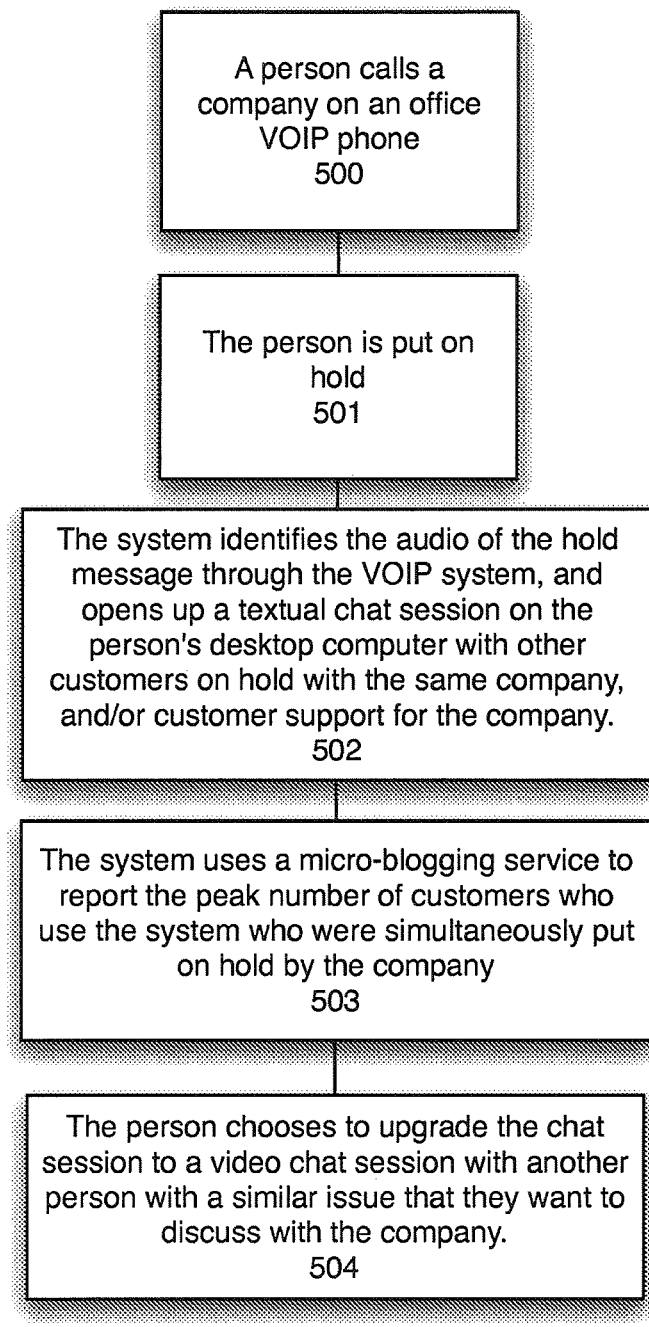

Referring to FIG. 5, in some embodiments, a person may call a company using an office VOIP phone, e.g. using a headset associated with a desktop computer in step 500. In step 501, the person is put on hold. In step 502, the system may identify the audio of the hold message, provided by the VOIP system, and may open up a textual chat session on the desktop computer with other customers that are on hold with the same company, and/or customer support for the company. In step 503, the system may use a micro-blogging service, for example, to report, for example, the peak number of customers who use the system who were simultaneously put on hold by the company, e.g. within a city or region. In step 504, the person may choose to upgrade the textual chat session to a video chat session with another person with a similar issue that they want to discuss with the company.

Figure 6:
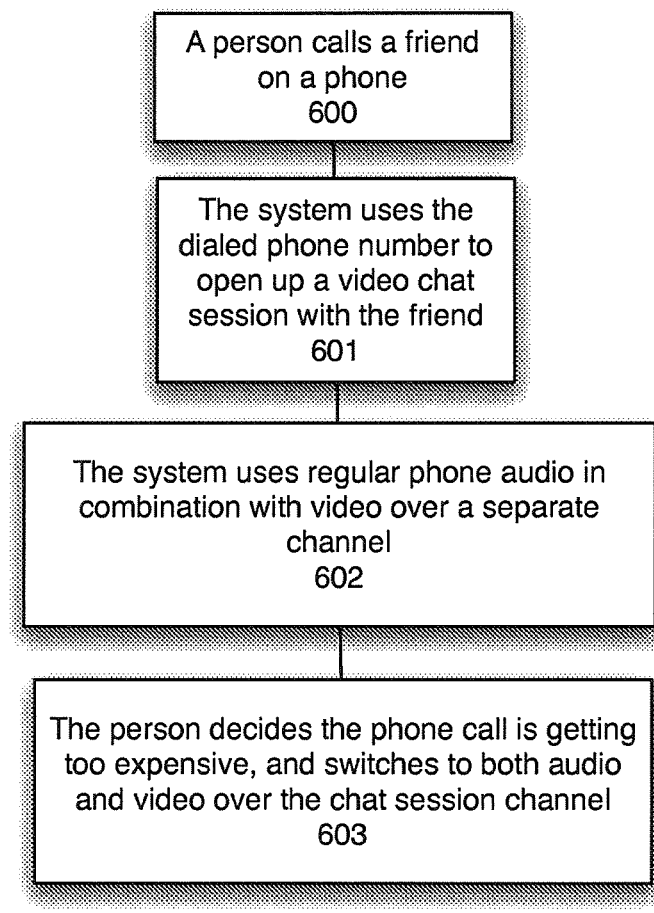

Referring to FIG. 6, in some embodiments, a person may call a friend on a phone in step 600. In step 601, the system may use the audio data, the dialed phone number, or other metadata to open up a video chat session with the friend. In step 602, the system may use regular phone audio in combination with video over a separate, e.g. data, channel. In step 603, the person may decide that the phone call is getting too expensive, and may switch to transmitting and receiving both audio and video over the video chat session channel.

Figure 7:
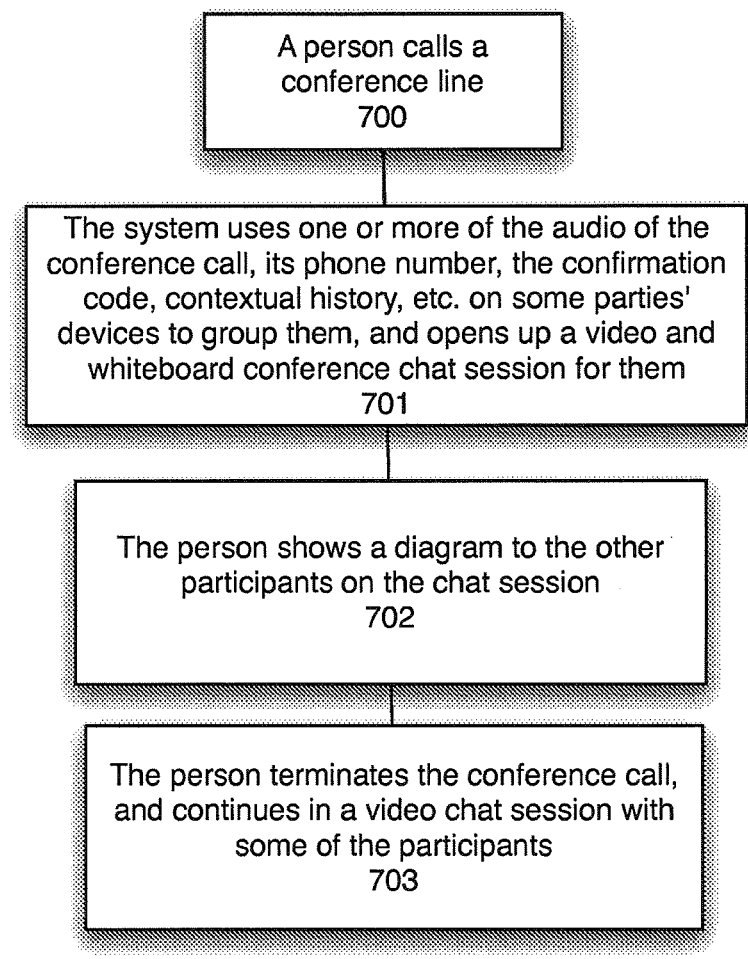

Referring to FIG. 7, in some embodiments, a person may call a conference line, such as a telephone conference service which is reached via a phone number, and uses, for example, a confirmation code to associate the appropriate parties who dial in, in step 700. In step 701, the system may use one or more of the audio of the conference call, its phone number, the confirmation code, contextual history, etc., on some parties' devices to group them, and may open up a video and whiteboard conference chat session for them. In step 702, the person may show a diagram to the other participants on the chat session. Participants who do not participate in the described system, may be added to the chat session(s), e.g. by explicit person reference, chat session reference, etc., or by a service, for example, that takes a passcode, phrase, etc., presented by the system to participants, and converts this into a reference to the session(s). In step 703, the person terminates the conference call, and continues in a video chat session with some of the participants.

It should be understood by one skilled in the art, that the system does not depend on any particular type of device, such as a smart cellphone. In some embodiments, no personal device at all is used. Instead, the system may, for example, use a camera in the person's environment to identify him or her, retrieve his or her information from a database, and present content such as audio-visual material on displays, speakers, etc., in his or her environment.

Similarly, in some embodiments, the system does not depend on having databases reside in one particular place or another, or on the databases being single units as compared to being distributed.

In some embodiments, the system does not depend on tracking an individual's context. For example, the system may work with the context of all people, of people of ranges of heights, color, body temperatures, in ranges of weather conditions, etc.

In some embodiments, the system does not track people's contexts (whether individuals or groups), but may provide contextual content that is heavily location-based, for example, to devices, such as displays, speakers, cell phones, tablets, laptops, computers, etc., in a location. The selection and presentation of such content may still vary based on context, including historical and projected context, e.g., by taking historical interactions into account, and explicit and implicit feedback, e.g. as to the content's interest to people, or its correlation with commercial events, such as purchases.

Overview of Feedback-Based Learning to Update a Context-to-Action Mapping

As explained above, a context-to-content mapping may indicate certain content to provide in certain contexts. In a similar manner, a context-to-action mapping may indicate certain actions to take in certain contexts. Furthermore, in some embodiments, a context-to-action mapping may indicate certain actions to perform in response to detecting certain combinations of two or more context signals.

In an exemplary embodiment, a computing system may carry out an ongoing machine-learning process in order to populate and/or update a context-to-action mapping based on implicit feedback (and possibly based on explicit feedback as well). For example, an exemplary system may measure two or more context signals and then take an action that corresponds to the measured context signals, as indicated by the context-to-action mapping. The device may then detect feedback that relates to the appropriateness of the action, which is implicitly or indirectly provided by the user. For example, feedback may be inferred from a subsequent user-action that counteracts or cancels the previously-initiated action, or a subsequent user-action that relies or builds upon the previously-initiated action. For example, if context from a user causes a smart-home to pre-fill a warm bath for the user for when they arrive home and the user drains the bath without getting into it, that could be interpreted as a implicit negative reinforcement for having initiated that action for that user given that context. In a further aspect, an exemplary system may also receive explicit feedback, such as when a user-action explicitly indicates that an action was desired or undesired.

Numerous applications exist in which an exemplary device may intelligently update and customize actions for a user. For example, machine learning could be applied to enhance context-based home automation, to automatically create calendar entries and reminders, and/or to customize user interfaces, among other applications. In an exemplary embodiment, the context-to-action mapping takes into account the inter-dependent nature of various different context signals. In particular, since context signals may create context for one another, a device may define a matrix of conditional probabilities for certain actions when a certain context signal is detected, given the presence of other signals. This matrix may then be used to determine the likelihood that a certain action is desired by the user, given a certain combination of context signals.

Exemplary Methods

Figure 8:
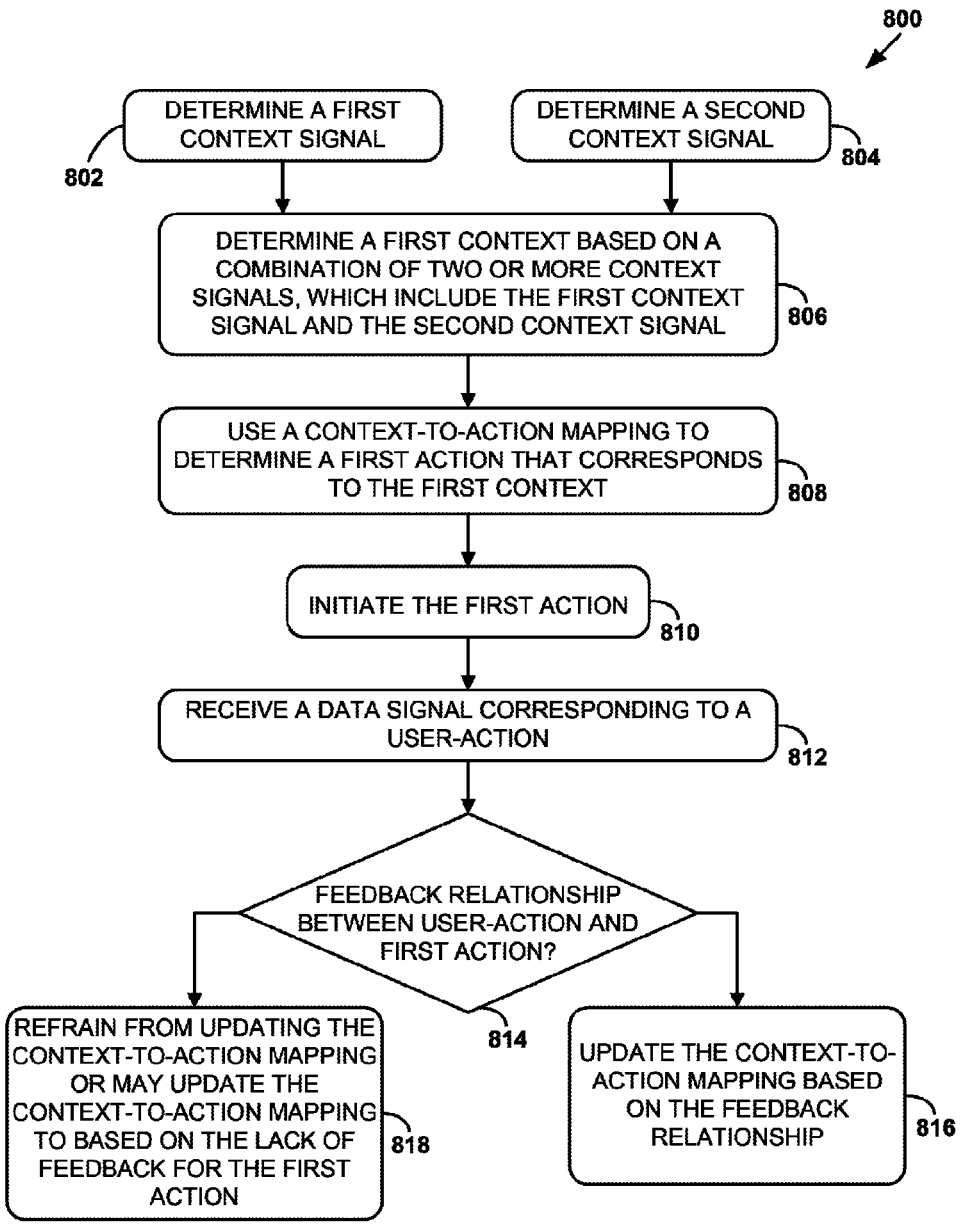
FIG. 8 is a flow chart illustrating a method according to an exemplary embodiment.

FIG. 8 is a flow chart illustrating a method according to an exemplary embodiment. In particular, method 800 involves a computing system determining a first context signal and determining a second context signal, as shown by blocks 802 and 804. The computing system then determines a first context based on a combination of two or more context signals, which include the first context signal and the second context signal, as shown by block 806. Once the computing system has determined the context signals, the computing system may use a context-to-action mapping to determine a first action that corresponds to the first context, as shown by block 808. The computing system then initiates the first action, as shown by block 810.

After initiating the first action, the computing system may receive a data signal corresponding to a user-action, as shown by block 812. The computing system may then analyze the data signal to determine whether a feedback relationship exists between the user-action and the first action, as shown by block 814. If a feedback relationship exists, then the computing device may update the context-to-action mapping based on the feedback relationship, as shown by block 816. If no feedback exists, then the computing system may refrain from updating the context-to-action mapping or may update the context-to-action mapping based on the lack of feedback for the first action, as shown by block 818.

An exemplary context-to-action mapping may be used to help more intelligently automate numerous types of actions, in numerous different applications. For example, the context-to-action mapping may be used for home-automation actions, calendar and scheduling actions, and/or customization of user interfaces. Further, a context-to-action mapping may be used to automate actions by computing systems used in various different fields, such as consumer products, professional services, medical fields (e.g., to support doctors, nurses, and emergency medical technicians (EMTs)), heavy industry, shipping services (e.g., to enhance tracking and reporting services), construction (e.g., to support field crew and supervisors), sporting events, agriculture, the energy industry, aviation (e.g., to enhance and automate pre-flight engine and system verification processes and auto-pilot controls), law enforcement, public safety, and entertainment and performance arts, among others.

In some embodiments, such as method 800, the context-to-action mapping may map the first action to a certain context, which is in turn determined based on certain context signals. For example, context signals indicating that that it is 6:30 AM on a weekday and that a user is located at their home may be used to determine the context that the user is "getting ready for work." Additionally or alternatively, a context-to-action mapping may directly map certain actions to a certain context signals, or to certain combinations of context signals. Other variations are also possible.

Applications of exemplary methods in several areas will now be described in greater detail.

A. Home Automation

An exemplary method may be used by various computing devices to initiate home-automation actions. For example, an exemplary method may involve control and/or communication with (a) a home appliance, (b) a refrigerator, (c) a microwave, (d) a dishwasher, (e) a freezer, (f) a washer, (g) a dryer, (h) a combination washer and dryer, (i) a television, (j) a home stereo unit, (k) a laptop computer, (l) a desktop computer, (m) a tablet computer, (n) a smartphone, (o) a garage door opener, (p) a home security system, (q) a home-automation control system, (r) a heating appliance, (s) a cooling appliance, and/or (t) a cooking appliance, among others.

As one example of a home-automation application, an exemplary device may determine, based on two or more context signals, that a user is travelling to their home after an activity involving exercise. For example, a user's smartphone may determine, based on context signals such as a series of location measurements, accelerometer measurements, compass readings, the time of day (e.g., when a user normally comes home after an evening workout), and so on, that the user is driving to their home. In addition, a calendar entry, which indicates that the user had a session scheduled with a personal trainer just prior to driving home, may provide an additional context signal indicating where the user is driving home from. In response, the device may conclude that it should initiate or set up an action appropriate for when the user has just returned home from exercising. For example the smartphone may communicate with a network connected bathtub, possibly via a home-control center, in order to draw a bath that will be hot when the user arrives home.

Further, the smartphone may derive implicit feedback from a subsequent action. For example, the smartphone may determine that user did not take a bath and/or let the water get cold, and interpret this as implicit feedback that it was incorrect to draw the bath in this scenario. The smartphone may derive implicit feedback in various ways, such as the following, which may be carried out alone or in various combinations: (a) receiving temperature measurements from temperature sensors in the bathtub (which may indicate that the user let the bath water get cold), (b) receiving data from motion sensors installed at or near the bathtub (which may indicate that the user did not enter the bathroom and/or did not get into the bathtub), (c) using location determination techniques to determine the smartphone's location, and use this as a proxy for the associated user's location (which may indicate that the user did not enter the bathroom and/or did not get into the bathtub), (d) using short-range wireless communications (e.g., RFID or NFC) to determine when and/or for how long the smartphone is near a device located in the bathroom (which may indicate whether the user entered the bathroom after arriving at home and/or stayed in the bathroom long enough to take a bath), and/or (e) receiving measurements from water-level and/or moisture sensors in the bathtub (which may indicate that the bathtub was emptied without the user having bathed). Other types of implicit feedback, and other techniques for deriving implicit feedback from a user-action, are also possible.

The smartphone may then update a context-to-action mapping based on the implicit feedback. For example, if the smartphone determines that the user let the bath water get cold and/or did not take a bath, then it may update the context-to-action mapping to make it less likely that a bath will be drawn in the same context in the future. Other examples are also possible.

In the above example, the action (e.g., drawing a bath) was adjusted to make the action more or less probable in a certain context. It is also possible that certain parameters of an action may be adjusted so that the action is carried out in a different way, with or without adjusting the probability that the action is correct in the context. For example, in the above application, the timing with which the bath is drawn may be adjusted, without necessarily changing the probability that the bath is the correct action in the given context. For instance, if it is determined that the user let the bath get cold, drained the bath, and then immediately refilled the bath with hot water, this may be interpreted as implicit feedback that the action was correct, but the timing of the action was not. In this scenario, a timing parameter of the "draw a bath" action in the context-to-action mapping may be updated such that when the same context signals are detected in the future, there is more delay before initiating the action. Many other examples are also possible.

In another home-automation example, a user may load their network-connected washing machine with clothes before they leave for work in the morning. In this scenario, if the user were to start a wash cycle before leaving for work, the cycle would likely finish before the user arrived home, allowing ample time for the clothes to become moldy. Therefore, it may be beneficial to time the wash cycle so that it finishes just before the user arrives home. However, the timing of the user's return home may vary from day to day. Accordingly, an exemplary method may be used to learn how to use context to intelligently time the wash cycle to finish at or near when the user arrives home.

As one example, if the user's commute is of a similar duration to the wash cycle, an exemplary device may use context signals such as a series of location measurements, accelerometer measurements, compass readings, the time of day (e.g., when a user normally comes home after an evening workout), and so on, to determine that the user has just started their drive home, and responsively start the wash cycle. In particular, a user's smartphone may by default start the wash cycle when it: (a) determines that the user is in their car, such as by using GPS location data and/or accelerometer data to determine that the user's rate of movement is indicative of being in a car, (b) determines that it is a day of the week that the user typically works a nine-to-five job, and (c) determines that the current time is when a user typically gets off work (e.g., after 5:00 pm).

However, in an instance where the smartphone initiates a wash cycle, the smartphone may determine that the user starts a subsequent wash cycle before running the dryer. Since the user ran the washer again without first running the dryer, the smartphone may infer that the user is likely re-washing the same clothes. Accordingly, the smartphone may determine that, in this instance, it was incorrect to start the wash cycle. However, because this action was correct in this context in the past, it may be desirable modify the context-to-action mapping for this action to account for additional context signals. For instance, the device may analyze records of context signals that were not included in the context leading to the action, looking for differences that could account for the action being correct in the past and not correct in the most-recent case. As a specific example, the device might determine that on this day, the user's calendar indicated they had a haircut appointment after work. The device may therefore add context signals from a user's calendar to the context-to-action mapping for starting the wash cycle, such that when the user has an appointment after work, the wash cycle is further delayed to allow time for the appointment.

B. Scheduling and Calendar Management

An exemplary method may be used by various computing devices to initiate various appointment, calendar, reservation, and/or schedule management actions. For instance, an exemplary device may be configured to learn which contexts are appropriate for actions such as: (a) creating a calendar entry, (b) deleting an existing calendar entry, (c) updating an existing calendar entry, (d) setting a reminder for a calendar entry, (e) creating a meeting entry, (f) deleting an existing meeting entry, (g) updating an existing meeting entry, (h) sending one or more invitations for a meeting entry, (i) withdrawing one or more invitations for a meeting entry, (j) setting a reminder for a meeting entry, (k) creating a task entry, (l) deleting a task entry, (m) updating a task entry, and/or (n) setting a reminder for a task entry, among others.

As a specific example, an exemplary device may determine, based on two or more context signals, whether to set or cancel an alarm or reminder. For instance, based on historical context data, a smartphone may learn that on Wednesdays, a user typically gets up an hour early to go to the gym before work. Accordingly, the smartphone may automatically set a weekly alarm or reminder for Wednesdays at thirty minutes before the time the user typically goes to the gym. However, several weeks later, on a Tuesday, the smartphone may detect a user-action which it interprets as implicit feedback indicating the Wednesday morning alarm should be canceled or set for a later time. For example, if a user sends a text message at 1:30 am in the morning on Wednesday, the smartphone may responsively turn off the alarm or reset the alarm to get the user up just in time for work (without allowing time for a workout).

In the above example, an exemplary method could be used to learn to turn off or delay the alarm in this scenario. For instance, the smartphone may have detected a late night text message or another user-action indicating the user stayed up late in the same scenario in the past. Further, it may have kept the alarm as scheduled (allowing time for a work out). However, the user may have hit "snooze" repeatedly and skipped their workout. In response, the smartphone may have detected the repeated activation of the snooze function, and added the late-night text message context signal to the analysis for the action of providing a Wednesday morning alarm.

As another example of calendar management, an exemplary method could be used to learn when reservations should or should not be canceled or updated. For example, if conflicting reservations are made, a given reservation may be canceled based on context signals that are interpreted to indicate that the other reservation is more important and/or that the other reservation is what the user intends to actually do. For instance, an exemplary device may automatically cancel a restaurant reservation when it determines another restaurant reservation is subsequently made. However, the device may later determine that the user does, in fact, eat at the restaurant where the reservation was canceled. This device may do so by, for example, detecting that the user calls the restaurant or goes to a reservation website to re-establish the reservation, or by detecting a charge to the user's credit card from the restaurant at or near the time of the canceled reservation. In such a scenario, the device may update the context-to-action mapping to make it less likely that a future reservation will be canceled in this scenario.

C. User-Interface Customization

An exemplary method may be used by various computing devices to initiate various user-interface changes, and learn contexts in which such changes are or are not appropriate. For example, an exemplary device may be configured to learn which contexts are appropriate for user-interface actions such as: (a) changing the visual appearance of a user-interface, (b) activating or de-activating a certain user-interface system or device (e.g., changing the user-interface device via which a user can provide input to certain application), and/or (c) changing the way interactions with a user-interface are interpreted (e.g., reassigning a mouse button or keyboard shortcut to a different operation), among others.

As one specific example, a wearable computer with a head-mounted display (HMD) may determine, based on two or more context signals, that a user who is driving their car is lost. (Note that a wearable computer with an HMD is described in greater detail with references to FIGS. 12A, 12B, and 13.) For instance, the wearable computer may determine a "lost while driving" context for the driver by analyzing context signals such as: (a) the user's location, (b) the user's direction of travel, (c) a calendar entry indicating the user has an appointment at a certain location (that the user's direction of travel is carrying them away from), (d) a route of travel (e.g., where the user has "gone in circles," or traveled on a "zig-zag" course), (e) measurements from biometric sensors (e.g., a pulse reading indicating that the users pulse has gone up), among others.

When the wearable computer determines the user is "lost while driving," the wearable computer may access context-to-action mapping data and determine that the appropriate action in this context is displaying a map in the HMD (preferably in the peripheral of the user's field of view, so that the map does not obstruct the user's view of the road). Accordingly, the wearable computer may display a map which shows the user's current location, and possibly directions to an intended location if available or determinable, in the HMD. Further, the wearable computer may detect that the user turns down the car stereo at or near the time when it is determined that the user is "lost while driving." This may be interpreted as implicit feedback that, in addition to displaying the map, the wearable computer might want to initiate an action to turn down the car stereo when it determines the user is "lost while driving." If this scenario occurs a number of times, then the wearable computer may update the context-to-action mapping to indicate that when the user is "lost while driving," it should display a map and turn down the car stereo, so that the user can concentrate on the map and finding their way to their intended destination.

It should be understood that the above example applications are provided for illustrative purposes, and are not intended to be limiting. Many other applications are also possible.

Exemplary Computing System

Figure 9:
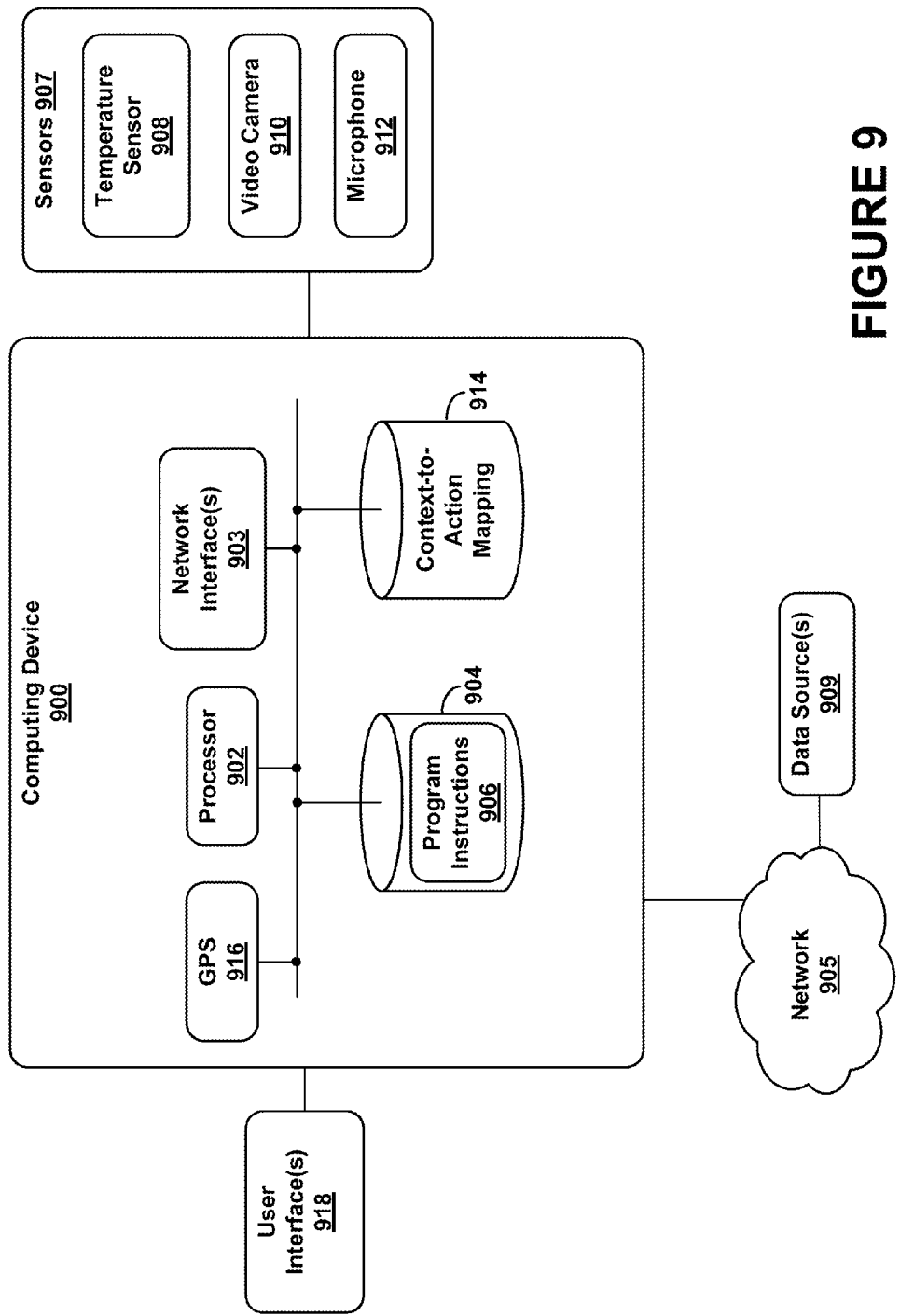
FIG. 9 is a block diagram illustrating a computing device according to an exemplary embodiment.

FIG. 9 is a block diagram illustrating a computing device according to an exemplary embodiment. The computing device 900 includes a processor 902 and a non-transitory computer readable medium 904 having program instructions 906 stored thereon. The program instructions 906 may be executable to carry out the exemplary computing-device functions described herein. For example, the program instructions 906 may be executable to determine various context signals, to use a context-to-action mapping to determine an action to take, to determine when a subsequent user-action provides implicit feedback relating to a subsequent action, and to update the context-to-action mapping based on the implicit feedback, among other functions.

Computing device 900 may also include one or more network interfaces 903, which may include wired and/or wireless network interfaces. The network interfaces 903 may allow for communications via various different networks 905 with other entities on the networks 905, such as one or more network-based data sources 909.

In addition, computing device 900 may include, have access to, or otherwise be provided with data input from one or more user-interfaces 918. User interfaces 918 may be any type of user-interface via which a user can interact with computing device 900 or another computing device in communication with computing device 900. Exemplary user interfaces 918 may include a touch-based user-interface (e.g., a "touchscreen" or "touchpad"), a keyboard, a mouse, and/or buttons or switches on a computing device, among others. Further, in some embodiments, video camera 910 may function as a user interface by, for example, capturing a user's hand gestures that can interpreted as input from the user. Similarly, in some embodiments, microphone 912 may function as a user interface by, for example, capturing speech commands by a user. Other user interfaces are also possible.

The computing device 900 may also include or have access to a number of sensors 907, from which the computing device 900 may receive data signals. In particular, the computing device 900 may be configured to acquire data signals and/or receive measurements from one or more temperature sensors 908, one or more video cameras 910, and one or more microphones 912. It should be understood that an exemplary computing device may include and/or receive data signals from more or less sensors than illustrated in FIG. 9, without departing from the scope of the invention. Furthermore, an exemplary computing device may include or have access to a different type or different types of sensors, in addition or in the alternative to one or more of the illustrated sensors, without departing from the scope of the invention.

The computing device 900 may be configured to acquire data from which it determines context signals in various ways. In some cases, data acquired from a sensor 907 may include context signals that can be used by computing device 900 without further analysis of the data. Computing device 900 may also determine context signals by analyzing data received from sensors 907. In addition, computing device 900 may be configured to acquire data from one or more network-based data sources 909. As such, computing device 900 may extract context signals included in data received from data sources 909, and/or analyze data received from data sources 909 to determine context signals.

Computing device 900 may also acquire context signals or date from which it can determine context signals from other data sources and/or using other techniques. Further, computing device 900 may include other systems for determining context signals. For example, computing device 900 may include or have access to a GPS system 916 in order to determine its GPS location. Other examples are also possible.

In a further aspect, computing device 900 may be configured to acquire data from the sensors 907 in various ways. For example, the computing device 900 may monitor a continuous data feed from a given sensor 907. As a specific example, the computing device 900 might monitor an incoming audio signal captured by microphone 912. The computing device 900 may also take discrete measurements of data signals from the various sensors 907. For instance, the computing device 900 may record the temperature as measured by a temperature sensor 908 at a given point in time. Such a measurement may be acquired by, for example, taking a discrete measurement from a data feed provided by a sensor, or by causing the sensor itself to take a discrete measurement.

Furthermore, computing device 900 may be configured to isolate and/or analyze a particular portion of a data signal from a given sensor 907. For example, computing device 900 may identify a certain portion of a video signal received from video camera 910 or a certain portion of an audio signal received from microphone 912, and may then analyze the identified portion or portions to determine a context signal therefrom.

In a further aspect, in order to determine whether a given user-action can be interpreted as implicit feedback for a previous automatically-initiated action and/or whether implicit feedback can be derived from the given user-action, computing device 900 may include, have access to, or otherwise be provided with program logic for evaluating user-actions (not shown). This feedback determination logic may define certain rules and/or certain functions that may be used to identify implicit feedback.

In an exemplary embodiment, the feedback determination logic may include implicit-feedback determination logic, which specifies how to detect implicit feedback in, and/or derive implicit feedback from, data corresponding to certain user-actions. In some embodiments, the implicit-feedback determination logic may indicate a certain characteristic or characteristics of a certain user-action that may be interpreted as implicit feedback for a given automatically-initiated action. Yet further, in some embodiments, the implicit-feedback determination logic may identify certain data patterns, which, if detected in user-input data (e.g., data received via user-interface(s) 918), may be interpreted as implicit feedback for a given automatically-initiated action. Other examples of how implicit-feedback determination logic facilitates detecting and/or deriving implicit feedback are also possible.

In some embodiments, the feedback determination logic may also include explicit-feedback determination logic, which indicates data patterns that correspond to explicit feedback to certain user-actions and/or data patterns that correspond to explicit feedback applying generically to all user-actions. In some embodiments, the explicit-feedback determination logic may identify certain data patterns, which, if detected in user-input data (e.g., data received via user-interface(s) 918), are defined as explicit feedback for a given automatically-initiated action (or possibly for any automatically-initiated action). Other examples of how explicit-feedback determination logic defines which user-actions constitute explicit feedback are also possible.

A. Context Signals

As noted above, an exemplary computing device 900 may be configured to determine various context signals, and to initiate an action based on a combination of two or more context signals. In general, a "context signal" may be any signal that provides a measurement or otherwise provides information pertaining to the state or the environment associated with a certain subject (e.g., with a certain person, device, event, etc.).

Many types of information, from many different sources, may be used as context signals or provide information from which context signals may be determined. For example, context signals may include: (a) the current time, (b) the current date, (c) the current day of the week, (d) the current month, (e) the current season, (f) a time of a future event or future user-context, (g) a date of a future event or future user-context, (h) a day of the week of a future event or future context, (i) a month of a future event or future user-context, (j) a season of a future event or future user-context, (k) a time of a past event or past user-context, (l) a date of a past event or past user-context, (m) a day of the week of a past event or past user-context, (n) a month of a past event or past user-context, (o) a season of a past event or past user-context, ambient temperature near the user (or near a monitoring device associated with a user), (p) a current, future, and/or past weather forecast at or near a user's current location, (q) a current, future, and/or past weather forecast at or near a location of a planned event in which a user and/or a user's friends plan to participate, (r) a current, future, and/or past weather forecast at or near a location of a previous event in which a user and/or a user's friends participated, (s) information on user's calendar, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a monitoring device, (v) items that are currently detected by a monitoring device, (w) items that have been detected in the past by the monitoring device, (x) items that other devices associated with a monitoring device (e.g., a "trusted" monitoring device) are currently monitoring or have monitored in the past, (y) information derived from cross-referencing any two or more of: information on a user's calendar, information available via a user's social networking account, and/or other context signals or sources of context information, (z) health statistics or characterizations of a user's current health (e.g., whether a user has a fever or whether a user just woke up from being asleep), and (aa) a user's recent context as determined from sensors on or near the user and/or other sources of context information, (bb) a current location, (cc) a past location, and (dd) a future location. Those skilled in the art will understand that the above list of possible context signals and sources of context information is not intended to be limiting, and that other context signals and/or sources of context information are possible in addition, or in the alternative, to those listed above.

Some context signals may take the form of discrete measurements. For example, a temperature measurement or a current GPS location may be used as a context signal. On the other hand, context signals may also be determined or measured over time, or may even be a continuous signal stream. For instance, an exemplary device 900 may use the current volume of a continuous audio feed from an ambient microphone as one context signal, and the volume of a continuous audio feed from a directional microphone as another context signal.

In a further aspect, context signals may measure a binary context parameter which has two possible outcomes. For example, a binary context signal may indicate either that an event did or did not occur. However, context signals may provide a measure of a context parameter that has a finite number of possible outcomes or is limited to a certain range of outcomes (e.g., a real number between 1 and 100).

In another aspect, a given context signal may be classified as providing a certain type of context information. Further, a context-signal type may be general or specific. For example, a body temperature measurement taken at the wrist may be classified as a "temperature" context signal, as a "body temperature" context signal, or as "body temperature on the wrist" context signal. As such, two context signals may be considered to be of the same type in some scenarios, but not in others. For instance, a body temperature measurement on the wrist and a body temperature measurement on the neck may be considered the same type of context signal because they both may be considered "temperature" or "body temperature" measurements. Other examples are also possible.

In a further aspect, a "context" may be a data-based description or characterization of an environment or state that is determined or derived from one or more context-signals. For example, contexts may take the form of data indicating environment or state information such as "at home," "at work," "in a car," "indoors," "outside," "in a meeting," etc. Furthermore, a context may be a qualitative or quantitative indication that is determined based on one or more context signals. For example, context signals indicating that that it is 6:30 AM on a weekday and that a user is located at their home may be used to determine the context that the user is "getting ready for work."

In some embodiments, the detection or observation of a certain event in data from a certain data source may itself be interpreted as a context signal. For example, the fact that a certain word is detected in an audio signal from microphone 912 may be interpreted as a context signal providing context to the event of that word being spoken. Other examples are also possible.

In some embodiments, context signals may be obtained or derived from sources such as a user's computer-based calendar, blog, webpage, social network account, and/or e-mail account, among others. For instance, context signals may be provided by user's calendar entries, e-mail messages, and social-network profile, messages, posts, and/or tweets. Further, in some embodiments, similar context signals may be obtained or derived from other users' computer-based calendars, blogs, webpages, social network accounts, and/or e-mail accounts, who are listed in a user's electronic contact list, listed as a "friend" in a user's social network, or otherwise associated with the user (provided such users have opted in to share such context information).

It should be understood that the above examples of context signals and context are provided for illustrative purposes, and are not intended to be limiting. Other examples are also possible.

B. Context-to-Action Mapping

In a further aspect, in order to determine which action should be initiated at a given time, computing device 900 may include a context-to-action database 914, which defines the context-to-action mapping. The context-to-action mapping may map certain contexts to corresponding actions. The context-to-action mapping may include simple mappings from a single context signal to a certain corresponding action, as well as more complex mappings, which may indicate various actions that correspond to various combinations of context signals. Further, while context-to-action database 914 is illustrated as a separate from non-transitory computer readable medium 904, it is also possible that the context-to-action database 914 may be stored on the non-transitory computer readable medium 904. Additionally or alternatively, a context-to-action database may be stored at a remote entity, which may provide computing device 900 with access to the context-to-action mapping and/or facilitate functionality that utilizes the context-to-action mapping.

In an exemplary embodiment, the function of using the context-to-action mapping to determine that the first action corresponds to the first context may involve the computing system applying context-to-action mapping logic to the first and second context signals, and evaluating a probability that the action is correct given the context.

In some embodiments, the context-to-action mapping may indicate conditional probabilities that a given action is correct when a first context signal is detected, given that a second context signal is also detected. Using conditional probabilities may help to account for the fact that various context signals may be correlated with one another. In particular, because context signals may not be independent, an exemplary context-to-action mapping may build a full conditional-probability matrix for a number of context signals that are correlated with one another, which indicates, for each pairing of context signals, the probability a given action is correct when a given context signal is detected, given that another context signal is also detected. Details of such statistical-analysis techniques, which may be applied when the probability of an event depends on a number of variables that are also dependent on one another, are well known in the art, and thus are not discussed further herein.

In an exemplary method, the computing system may pre-select an action to look up in the context-to-action mapping. The computing system may also use the context-to-action mapping data to analyze the correctness of a number of different actions. In this case, the computing system may select the action with the greatest probability of being correct, given the determined context, or possibly determine that no actions are likely enough to be correct to justify being initiated. For example, the computing system may select the action having the highest probability of being correct, so long as its probability of being correct is above a threshold level. In the event that the action most likely to be correct is not above the threshold, the computing system may determine that no action should be initiated.

In some embodiments, it is possible that a computing system may use the context-to-action mapping to initiate two or more actions. In such an embodiment, the computing system may set a threshold probability, and select some or all actions that have a probability of being correct that is greater than the threshold. Alternatively, the computing system may have a predetermined target number of actions to initiate. The computing system may then select the target number of actions having the highest respective probabilities. For instance, if the target is three actions, then the computing device may select the actions having the highest, second-highest, and third-highest probability of being correct. Further, the computing system may also select less than the target number of actions, if less than the target number of actions have a probability of being correct that is above a threshold.

In a further aspect, an exemplary context-to-action mapping may indicate that a computing device itself should carry out certain actions, or may indicate actions for other devices. In the event that the context-to-action mapping indicates the determined context corresponds to an action for another device, the computing device may send an instruction to the other device to carry out or schedule the action. For instance, in the home-automation examples described above, the device carrying out the method may instruct other devices (e.g., a network-connected bathtub, or network-connected washer) to carry out an action in response to context signals determined by the device. In such an embodiment, the device carrying out the method may provide the instructions to the other device via a device-to-device network communications, or via a centralized server that coordinates communications among a user's devices.

C. Feedback Related to Automatically-Initiated Action

In an exemplary embodiment, computing device 900 is configured to analyze a user-action and determine whether feedback related to a previously-initiated action can be derived from the user-action. In particular, when computing device 900 initiates uses the context-to-action mapping to automatically initiate an action, the computing device 900 may monitor subsequent user-actions and determine whether implicit feedback related to the automatically-initiated action can be derived from a subsequent user-action. In some embodiments, the computing device 900 may also determine whether a subsequent user-action constitutes explicit feedback related to the automatically-initiated action.

Generally, the analysis of a subsequent user-action may involve analysis of data corresponding to any interaction with a user-interface 918. For example, when a user interacts with a touchscreen interface, a keyboard, or a mouse, the interaction may be evaluated to determine if the interaction provides explicit feedback or can be interpreted as providing implicit feedback. Other examples are also possible.

i. Explicit Feedback

Generally, explicit feedback may include any sort of user-action that directly cancels or counters an automatically-initiated action, directly confirms the automatically-initiated action, or directly indicates a user's sentiment towards the automatically-initiated action. As a specific example, after a certain application is automatically initiated, an exemplary device may provide a prompt for explicit feedback to the user. For instance, a device may display a prompt on a graphical user-interface that queries the user as to whether or not the automatically initiated action was desired and/or should be repeated in similar circumstances in the future. Accordingly, a user-action providing an answer to this prompt may be used as explicit feedback, and the context-to-action mapping may be updated accordingly.

In a variation on the above example, the device may play out an auditory prompt querying the user as to whether or not the automatically initiated action was desired and/or should be repeated in similar circumstances in the future. The device may then monitor an audio feed from a microphone associated with the user for explicit verbal feedback that refers to the automatically-initiated action (e.g., "the action was correct/incorrect," "please take/do not take that action again in the future," "I did not mind that action being performed," "I'm not sure that that action was helpful," etc.). Additionally or alternatively, the device may monitor a keyboard and/or other user-interfaces for a response to the prompt for explicit feedback.

In some embodiments, an exemplary device may monitor incoming data from one or more user-interfaces for unprompted explicit feedback. For instance, an exemplary device may be configured monitor an audio feed from a microphone associated with the user for explicit verbal feedback that directly refers to the automatically-initiated action (e.g., "the action was correct/incorrect," "please take/do not take that action again in the future," "I did not mind that action being performed," "I'm not sure that that action was helpful," etc.). Additionally or alternatively, the device might monitor a keyboard and/or other user-interfaces for unprompted user-actions that are, for example, predefined as indicating explicit approval or disapproval for a previous automatically-initiated action.

ii. Implicit Feedback

Generally, implicit feedback may include any sort of user-action, or information that can be derived from a user-action, which indirectly cancels or counters an automatically-initiated action, indirectly confirms the automatically-initiated action, and/or indirectly indicates a user's sentiment towards the automatically-initiated action. For example, if a certain application is automatically opened, and the user closes or minimizes the application within a very short time period and/or closes the application without interacting with the application, this may be considered implicit feedback that the action was incorrect. On the other hand, of the user interacts with an application that has been automatically opened and/or takes a further action that builds upon or otherwise relies on the automatically-initiated action, this may be interpreted as implicit feedback indicating that the action was correct.

As another example of implicit feedback, an exemplary device could monitor an audio feed from a microphone associated with the user for speech that substantially matches a predetermined speech pattern, which corresponds to certain implicit feedback for an automatically-initiated action. For example, if the exemplary device detects speech that indicates general frustration, but does not reference the automatically-initiated action explicitly, this may be interpreted as implicit feedback that the action was not desired. Other examples are also possible.

Further, in some embodiments, the lack of subsequent action may itself be interpreted as a user-action that provides implicit feedback for a previous automatically-initiated action. For instance, if a certain application is automatically opened, and the user leaves the application open, but does not interact with the application for an extended period, this may be interpreted as implicit feedback that the action was not desired. Other examples are also possible.

In some embodiments, the subsequent user-action is not necessarily detected via interaction with a user-interface. For example, the user-action may instead be inferred from con-text-based analysis of a data signal. As a specific example, a smartphone may determine from the data signal provided by an ambient light sensor that the smartphone has been moved from a light place to a dark place. Based on this context, the smartphone may infer a user-action such as the user putting the phone in away in their pocket or elsewhere. If the smartphone previously initiated an action that required or requested the user interact with the smartphone in some manner, the inferred user-action of the putting the phone away may be interpreted as implicit feedback that the action was incorrect and/or is less likely to be correct in the future.

In a further aspect of some embodiments, the device carrying out the method may coordinate with other devices to receive data indicating user-actions at the other devices. For instance, referring again to the home-automation examples described above, the device carrying out the method may receive an indication of user-actions from other devices associated with the user of the device (e.g., the smartphone may receive indications from sensors in the network-connected bathtub). Other examples are also possible.

D. Updating the Context-to-Action Mapping

In an exemplary embodiment, computing device 900 may update the context-to-action mapping 914 in various ways, depending upon the implicit and/or explicit feedback. For example, computing device 900 may update context-to-action mapping 914 based on implicit and/or explicit feedback by: (a) updating the conditional probability that a certain action is correct given that a certain combination of two or more context signals is detected, (b) adding or removing a rule that indicates to take a certain action when a certain combination of two or more context signals is detected, (c) updating the parameters of a certain action to reflect additional information provided by the feedback, (d) updating a threshold probability that may be required before a certain action will be taken in response to a certain combination of two or more context signals, (e) updating the context-to-action mapping 914 to consider additional context signals when determining whether or not take a certain action, and/or (f) carrying out a machine-learning process to update the context-to-action mapping based on the feedback provided by the user-action. Other techniques for updating the context-to-action mapping 914 in view of implicit and/or explicit feedback obtained from a user-action are also possible.

As noted above, in some embodiments, computing device 900 may apply a machine-learning process to learn to associations between certain contexts and certain actions, and update context-to-action mapping 914 accordingly. In addition to the general techniques discussed herein, the computing device may apply any of well-known machine learning process such as an artificial neural network (ANN), SVM (Support Vector Machines), Genetic Algorithms, Bayes Nets, a Reinforcement Learning method, or a Decision Tree, for instance. After performing such a machine-learning, process the monitoring device may then be able to conclude from certain context signals values that certain aspects of the context-to-action mapping 914 are in accurate or could be more accurate, and then update the context-to-action mapping accordingly.

As a general matter, it should be understood that an example embodiment may involve continual learning and updating of associations between contexts signals and automatically-initiated actions, based on information observed over time and/or user-provided feedback. As such, the context-to-action mapping 914 may continually evolve as more information is acquired by the computing device 900.

E. Inter-Device Coordination

As described generally above, some embodiments may involve coordination of a user's devices so that a device carrying out an exemplary method can consider context signals detected by other devices, can instruct other devices to initiate actions, and/or can evaluate user-actions that occur on other devices for feedback on an automatically-initiated action. In some embodiments, a user may have a central computer-based account to which all their devices are registered, which allows for coordination among the devices.

Figure 10:
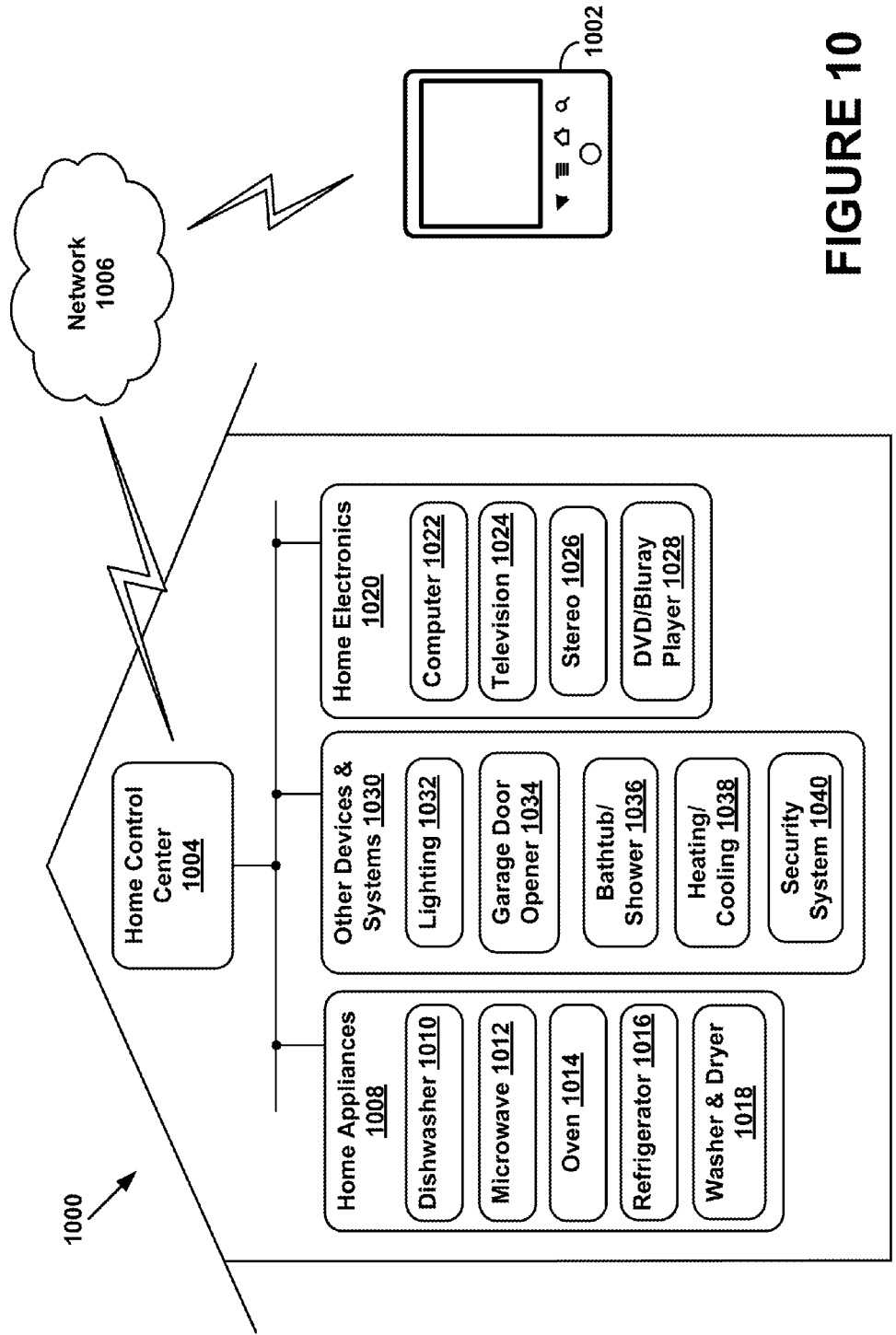
FIG. 10 is a block diagram illustrating a home network, according to an exemplary embodiment.

For example, FIG. 10 is a block diagram illustrating a network, according to an exemplary embodiment. The device network 1000 includes a given user's smartphone 1002, which may be registered to the given user's account, and may be used to control and/or communicate with the user's other devices. In particular, smartphone 1002 may be configured to communicate with devices in a user's home network via a home control center 1004. As shown, the smartphone 1002 and the home control center 1004 may both be connected via a network 1006, such as the Internet and/or a mobile service provider's network.

The home control center 1004 may be networked to any number of devices in a user's home network, which are also part of the user's device network 1000. For example, as shown, home control center 1004 is in communication with the devices in the user's home network, which include various home appliances 1009, various home electronics 1020, and other devices and systems 1030. As shown, the various home appliances 1009 include dishwasher 1010, microwave 1012, oven 1014, refrigerator 1016, and washer and dryer 1018. Further, the various home electronics 1020 include computer 1020, television 1024, stereo 1026, and DVD/Bluray Player 1028. Yet further, the other devices and systems 1030 include lighting 1032, garage door opener 1034, bathtub/shower 1036, heating/cooling system 1038, and security system 1040.

It should be understood that the devices in the device network 1000 are shown for illustrative purposes, and that an exemplary device network may include more or less devices, and may include other types of devices. For instance, a user's device network could easily include a laptop computer, a tablet computer, and/or a work computer at an office, among others. Furthermore, the functionality of the smartphone 1002 and/or devices in the home network 1000 may apply generally to any kind of network or group of devices and/or to any account to which multiple devices can register.

In a further aspect, while the illustrated embodiment shows a home control center that serves as an access point to home appliances 1008, home electronics 1020, and other devices and system 1030, it is also possible that each device in home network 1000 may connect to the network 1006 independently, or that some devices in home network 1000 may connect to the network 1006 independently while others connect through a home control center 1004.

In some embodiments, smartphone 1002 and/or some or all devices in the home network 1000 may each be configured to carry out an exemplary method, or portions thereof, in order to learn which actions to take in which context. In such an embodiment, the synergy of all the devices sharing context information and feedback may result in an increased learning rate.

F. Exemplary Cloud-Based System

Figure 11:
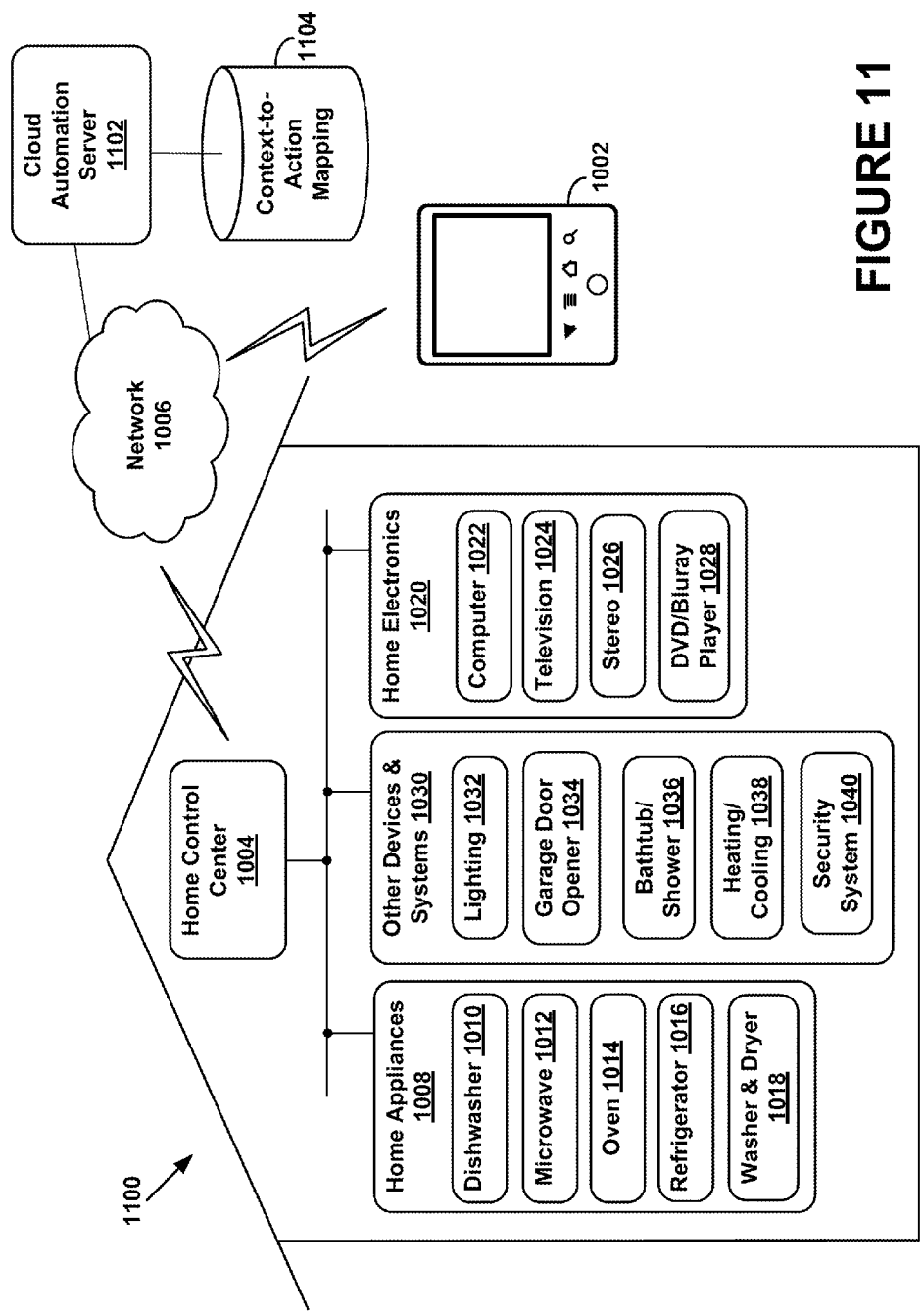
FIG. 11 is a block diagram illustrating another home network, which is connected to a cloud automation server, according to an exemplary embodiment.

Taking information-sharing one step further, an exemplary method may also be implemented by a cloud-based server. For example, FIG. 11 is a block diagram illustrating a cloud-based device network, according to an exemplary embodiment. As shown, cloud-based device network 1100 includes a cloud automation server 1102. According to an exemplary embodiment, cloud automation server 1102 can maintain a context-to-action mapping database 1104, which includes context-to-action mappings for a number of different user-accounts. In particular, context-to-action mapping 1104 may include context-to-action mapping data for each of a number of individual user-accounts. Additionally or alternatively, context-to-action mapping 1104 may include universal context-to-action mapping data that applies for all user-accounts.

In this configuration, cloud automation server 1102 may receive indications of context signals determined by a user's devices. For example cloud automation server 1102 may receive messages indicating various context signals determined by home appliances 1008, home electronics 1020, other devices and systems 1030, and/or smartphone 1002. The cloud automation server 1102 may aggregate the context signals for this user-account, to determine a context for the particular user-account. Then, based on the received context signals, cloud automation server 1102 may use a context-to-action mapping for the particular user-account to determine one or more actions to take. The cloud automation server 1102 may then initiate the actions by instructing one or more of home appliances 1008, home electronics 1020, other devices and systems 1030, and/or smartphone 1002 to perform an action.

Further, cloud automation server 1102 may be configured to receive indications of user-actions on home appliances 1008, home electronics 1020, other devices and system 1030, and or smartphone 1002. As such, cloud automation server 1102 may determine if the user-actions include implicit and/or explicit feedback related to the previously-initiated action. If feedback is received, cloud automation server 1102 may update the context-to-action mapping for the particular user-account in context-to-action mapping 1104 based on such feedback.

In a further aspect, for those users that opt in, cloud automation server 1102 may aggregate feedback obtained via an exemplary method across some or all users who opt in to such functionality. By aggregating feedback from all users, cloud automation server 1102 may increase its learning rate and more intelligently update context-to-action mappings for individual user-accounts, context-to-action mapping for group accounts that include a subset of users, and/or a universal context-to-action mapping that applies for all users.

H. Method for Feedback-Based Learning to Expand Context for Action

In some embodiments, a scenario may exist where feedback indicates that an action that was taken isn't as desirable as it was in the past when the action was taken in the same context (i.e., based on the same combination of context signals), or was incorrect when it was correct in the same context in the past. In this case, it may be unknown, what other context signals, which were not considered when initiating the action. Accordingly, in some embodiments, an exemplary method may be used to learn what additional context signals should be considered in the future, when determining whether to take the given action.

Figure 14:
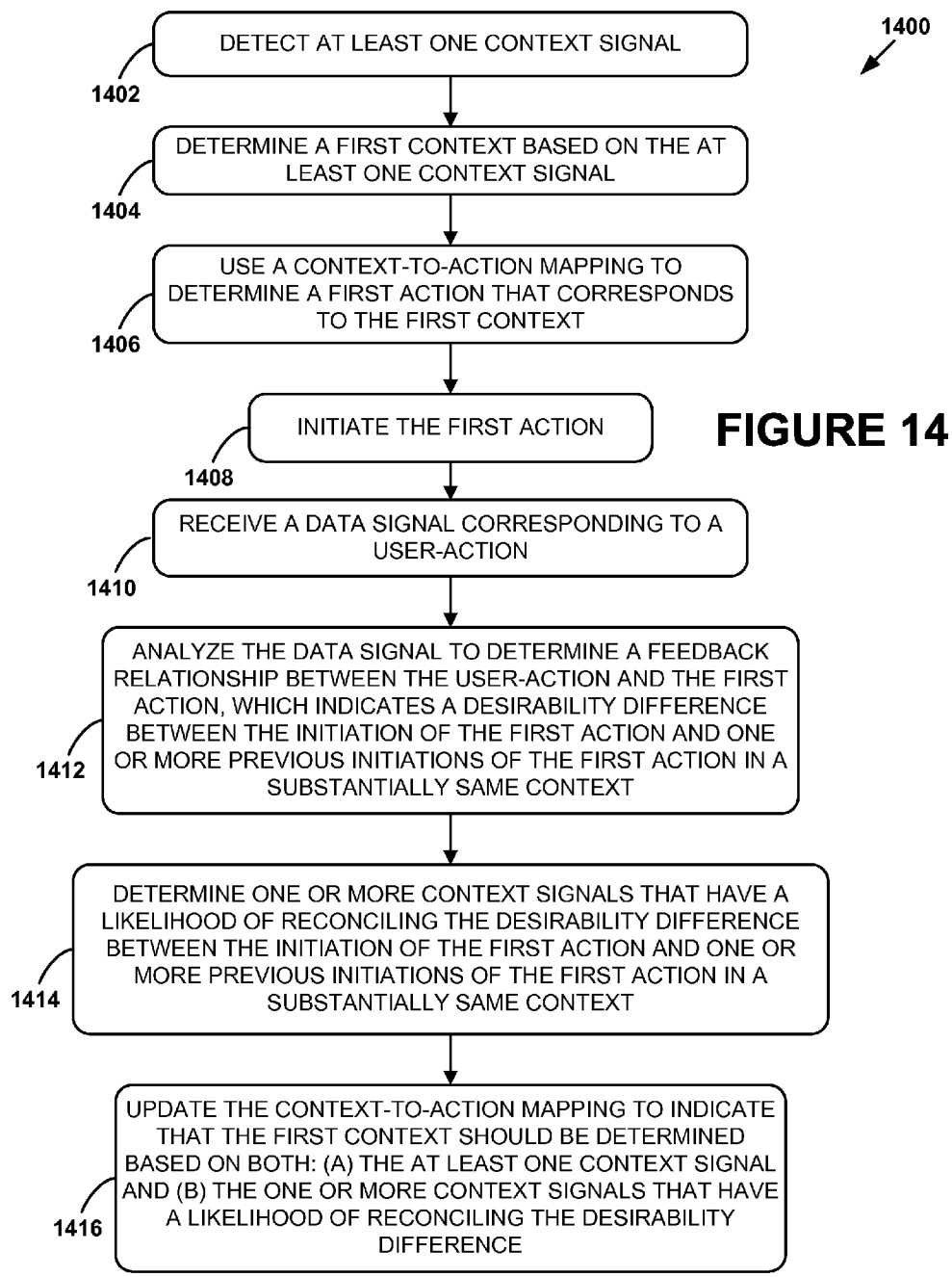
FIG. 14 is another flow chart illustrating a method according to an exemplary embodiment.

FIG. 14 is a flow chart illustrating a method according to an exemplary embodiment. In particular, method 1400 illustrates a method learning additional context signals to consider when determining whether to take an action, in order to reconcile a desirability difference between instances in which a given action is initiated.

More specifically, method 1400 involves a computing system detecting at least one context signal, as shown by block 1402. Then, at block 1404, the computing system determines a first context based on the at least one context signal. The computing system then uses a context-to-action mapping to determine a first action that corresponds to the first context, as shown by block 1406, and initiates the first action, as shown by block 1408. After initiating the first action, the computing system receives a data signal corresponding to a user-action, as shown by block 1410. The computing system analyzes the data signal to determine a feedback relationship between the user-action and the first action, which indicates a desirability difference between the initiation of the first action and one or more previous initiations of the first action in a substantially same context (e.g., based on the same combination of context signals), as shown by block 1412. Responsive to the feedback, the computing device determines one or more context signals that have a likelihood of reconciling the desirability difference between the initiation of the first action and one or more previous initiations of the first action in a substantially same context, as shown by block 1414. The computing device then updates the context-to-action mapping to indicate that the first context should be determined based on both: (a) the at least one context signal and (b) the one or more context signals that have a likelihood of reconciling the desirability difference, as shown by block 1416.

In exemplary embodiments, the computing device may vary the way in which it determines the one or more context signals that have a likelihood of reconciling the desirability difference. For instance, in some embodiments, the computing system may analyze data from a historical context-to-action database to determine the one or more context signals that have a likelihood of reconciling the desirability difference between the initiation of the first action and one or more previous initiations of the first action in a substantially same context.

For example, take the scenario where there is a discrepancy between a user's current and past approval of an action when the exact same context signals were detected. Accordingly, the computing system may employ an exemplary method to figure out what additional information might be incorporated in the context evaluation so that it can distinguish between the past instance when the action was desired, and the present instance, in which the action was not desired. Accordingly, the computing device may keep records of a number of different context signals over time, even though only a few of the context signals are used to determine the particular context that triggers the given action. In this case, the computing device may not be sure which context signals might explain the discrepancy, so it may analyze a number of other context signals that were not considered in the context evaluation, and identify one or more context signals that differ between the present and past instances where the desirability of the action differed. The computing device may then update the mapping so that these context signals are also considered in the future before taking the same action.

Further, in some embodiments, the computing system may prompt the user to identify the context signal or signals, or prompt the user to identify data from which the context signals may be derived. In other words, the computing system might explicitly solicit from the user what evidence or data stream they can supply to the system that can help to separate these two situations from each other (e.g., the user may explicitly tell the computing system to look at their calendar or another source of context information). More specifically, the computing system may initiate a prompt for input data to determine the one or more context signals that have a likelihood of reconciling the desirability difference. Other techniques for identifying the one or more context signals to add to the context evaluation for the given action are also possible.

Exemplary Wearable Computing Systems

As mentioned generally above, an exemplary computing device may take on various forms, one of which is a wearable computing device. For instance, in some embodiments, an exemplary computing system may take the form of a wearable computer having an HMD and a side-mounted touchpad interface. Such an embodiment may employ an exemplary method in various scenarios. The above-described example, in which an HMD displays a map to a wearer who is "lost while driving," is but one of many examples of a wearable computer employing an exemplary method. Many other examples are also possible.

Exemplary wearable-computing-device systems and functions will now be described in greater detail.

Figure 12A:
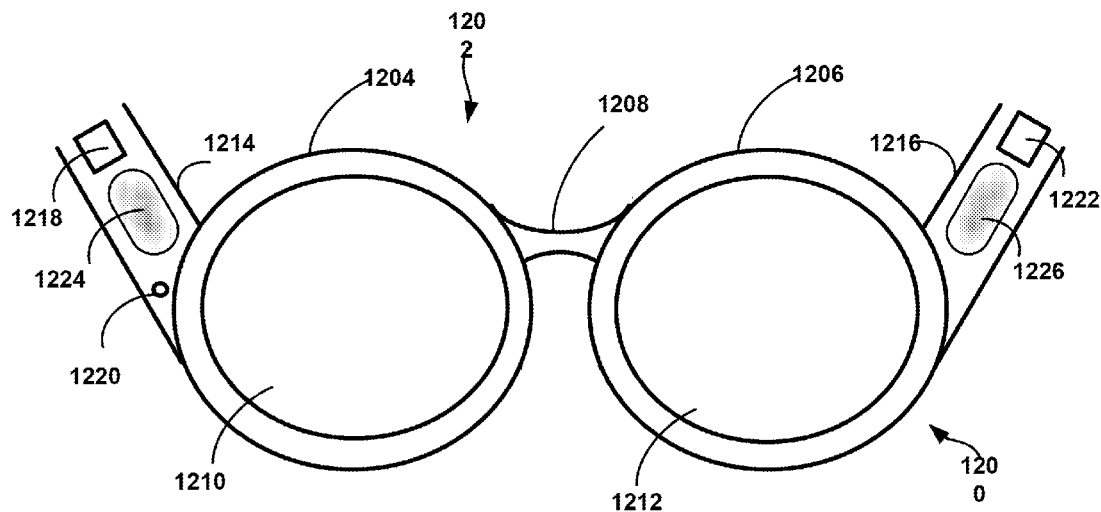
FIG. 12A illustrates an example wearable computing system for receiving, transmitting, and displaying data.

FIG. 12A illustrates an example wearable computing system for receiving, transmitting, and displaying data. The system 1200 is shown in the form of a wearable computing device. While FIG. 12A illustrates eyeglasses 1202 as an example of a wearable computing device, other types of wearable computing devices could additionally or alternatively be used. As illustrated in FIG. 12A, the eyeglasses 1202 comprise frame elements including lens-frames 1204 and 1206 and a center frame support 1208, lens elements 1210 and 1212, and extending side-arms 1214 and 1216. The center frame support 1208 and the extending side-arms 1214 and 1216 are configured to secure the eyeglasses 1202 to a user's face via a user's nose and ears, respectively. Each of the frame elements 1204, 1206, and 1208 and the extending side-arms 1214 and 1216 may be formed of a solid structure of plastic or metal, or may be formed of a hollow structure of similar material so as to allow wiring and component interconnects to be internally routed through the eyeglasses 1202. Each of the lens elements 1210 and 1212 may be formed of any material that can suitably display a projected image or graphic. Each of the lens elements 1210 and 1212 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 1214 and 1216 are each projections that extend away from the frame elements 1204 and 1206, respectively, and are positioned behind a user's ears to secure the eyeglasses 1202 to the user. The extending side-arms 1214 and 1216 may further secure the eyeglasses 1202 to the user by extending around a rear portion of the user's head. Additionally or alternatively, for example, the system 1200 may connect to or be affixed within a head-mounted helmet structure. Other possibilities exist as well.

The system 1200 may also include an on-board computing system 1218, a video camera 1220, a sensor 1222, and finger-operable touch pads 1224, 1226. The on-board computing system 1218 is shown to be positioned on the extending side-arm 1214 of the eyeglasses 1202; however, the on-board computing system 1218 may be provided on other parts of the eyeglasses 1202. The on-board computing system 1218 may include a processor and memory, for example. The on-board computing system 1218 may be configured to receive and analyze data from the video camera 1220 and the finger-operable touch pads 1224, 1226 (and possibly from other sensory devices, user interfaces, or both) and generate images for output from the lens elements 1210 and 1212.

The video camera 1220 is shown to be positioned on the extending side-arm 1214 of the eyeglasses 1202; however, the video camera 1220 may be provided on other parts of the eyeglasses 1202. The video camera 1220 may be configured to capture images at various resolutions or at different frame rates. Many video cameras with a small form-factor, such as those used in cell phones or webcams, for example, may be incorporated into an example of the system 1200. Although FIG. 12A illustrates one video camera 1220, more video cameras may be used, and each may be configured to capture the same view, or to capture different views. For example, the video camera 1220 may be forward facing to capture at least a portion of the real-world view perceived by the user. This forward facing image captured by the video camera 1220 may then be used to generate an augmented reality where computer generated images appear to interact with the real-world view perceived by the user.

The sensor 1222 is shown mounted on the extending side-arm 1216 of the eyeglasses 1202; however, the sensor 1222 may be provided on other parts of the eyeglasses 1202. The sensor 1222 may include one or more of a gyroscope or an accelerometer, for example. Other sensing devices may be included within the sensor 1222 or other sensing functions may be performed by the sensor 1222.

The finger-operable touch pads 1224, 1226 are shown mounted on the extending side-arms 1214, 1216 of the eyeglasses 1202. Each of finger-operable touch pads 1224, 1226 may be used by a user to input commands. The finger-operable touch pads 1224, 1226 may sense at least one of a position and a movement of a finger via capacitive sensing, resistance sensing, or a surface acoustic wave process, among other possibilities. The finger-operable touch pads 1224, 1226 may be capable of sensing finger movement in a direction parallel or planar to the pad surface, in a direction normal to the pad surface, or both, and may also be capable of sensing a level of pressure applied. The finger-operable touch pads 1224, 1226 may be formed of one or more translucent or transparent insulating layers and one or more translucent or transparent conducting layers. Edges of the finger-operable touch pads 1224, 1226 may be formed to have a raised, indented, or roughened surface, so as to provide tactile feedback to a user when the user's finger reaches the edge of the finger-operable touch pads 1224, 1226. Each of the finger-operable touch pads 1224, 1226 may be operated independently, and may provide a different function.

Figure 12B:
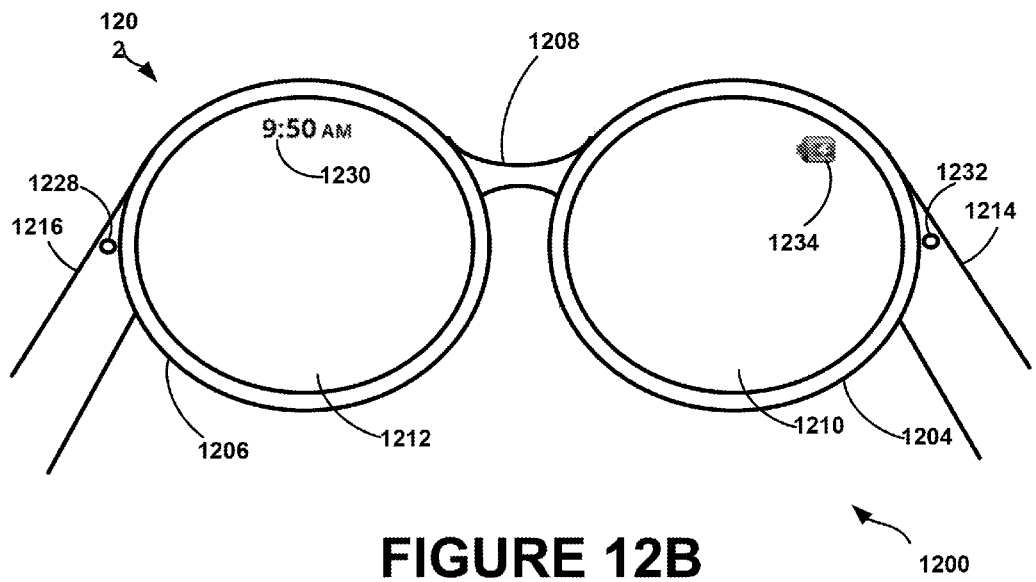
FIG. 12B illustrates an alternate view of the system of FIG. 12A.

FIG. 12B illustrates an alternate view of the system of FIG. 12A. As shown in FIG. 12B, the lens elements 1210 and 1212 may act as display elements. The eyeglasses 1202 may include a first projector 1228 coupled to an inside surface of the extending side-arm 1216 and configured to project a display 1230 onto an inside surface of the lens element 1212. Additionally or alternatively, a second projector 1232 may be coupled to an inside surface of the extending side-arm 1214 and configured to project a display 1234 onto an inside surface of the lens element 1210.

The lens elements 1210 and 1212 may act as a combiner in a light projection system and may include a coating that reflects the light projected onto them from the projectors 1228 and 1232. In some embodiments, a special coating may not be used (e.g., when the projectors 1228 and 1232 are scanning laser devices).

In alternative embodiments, other types of display elements may also be used. For example, the lens elements 1210, 1212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 1204 and 1206 for driving such a matrix display. Alternatively or additionally, a laser or LED source and scanning system could be used to draw a raster display directly onto the retina of one or more of the user's eyes. Other possibilities exist as well.

Figure 13:
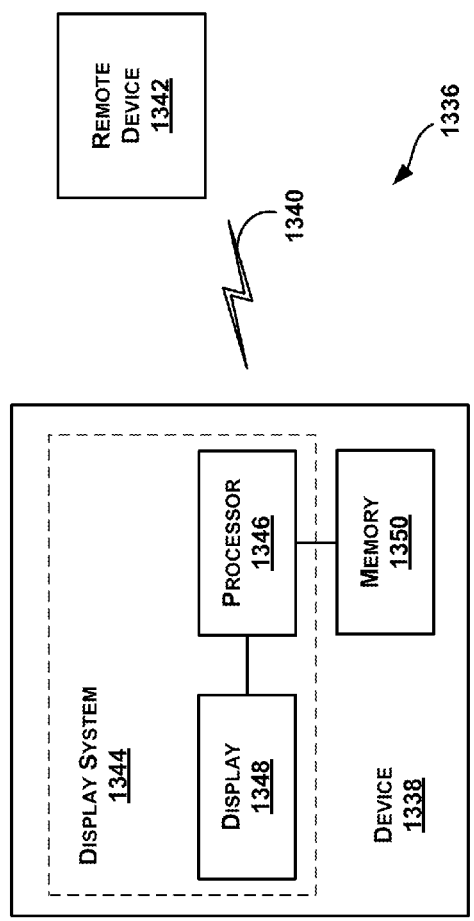
FIG. 13 illustrates an example schematic drawing of a wearable computing device.

FIG. 13 illustrates an example schematic drawing of a wearable computing device. In one exemplary system 1336, a device 1338 communicates using a communication link 1340 (e.g., a wired or wireless connection) to a remote device 1342. The device 1338 may be any type of device that can receive data and display information corresponding to or associated with the data. For example, the device 1338 may be a heads-up display system, such as the eyeglasses 1202 described with reference to FIGS. 12A and 12B.

Thus, the device 1338 may include a display system 1344 comprising a processor 1346 and a display 1348. The display 1348 may be, for example, an optical see-through display, an optical see-around display, or a video see-through display. The processor 1346 may receive data from the remote device 1342, and configure the data for display on the display 1348. The processor 1346 may be any type of processor, such as a micro-processor or a digital signal processor, for example.

The device 1338 may further include on-board data storage, such as memory 1350 coupled to the processor 1346. The memory 1350 may store software that can be accessed and executed by the processor 1346, for example.

The remote device 1342 may be any type of computing device or transmitter including a laptop computer, a mobile telephone, etc., that is configured to transmit data to the device 1338. The remote device 1342 and the device 1338 may contain hardware to enable the communication link 1340, such as processors, transmitters, receivers, antennas, etc.

In FIG. 13, the communication link 1340 is illustrated as a wireless connection; however, wired connections may also be used. For example, the communication link 1340 may be a wired link via a serial bus such as a universal serial bus or a parallel bus. A wired connection may be a proprietary connection as well. The communication link 1340 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 1342 may be accessible via the Internet and may comprise a computing cluster associated with a particular web service (e.g., social-networking, photo sharing, address book, etc.).

CONCLUSION

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

The description herein provides certain specific details for purposes of explaining various exemplary embodiments. One skilled in the art will understand that the technology may be practiced without many of these details. In some instances, well known structures and function have not been shown or described in detail to avoid unnecessarily obscuring the description of the embodiments of the technology. It is intended that the terminology used in the description presented herein be interpreted in its broadest reasonable manner, even though it is being used in conjunction with the detailed description of certain embodiments of the technology. Although certain terms may be emphasized below, any terminology intended to be interpreted in any restricted manner will be overtly and specifically defined as such in this detailed description section.

Further, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method comprising:
   determining a first context signal corresponding to a user-account;
   determining a second context signal corresponding to the user-account;
   determining, at a computing device, a first context of the user-account based on a combination of two or more context signals, the two or more context signals including the first context signal and the second context signal, wherein the first context comprises a data-based description or characterization of an environment or state that is associated with the user-account;
   using a context-to-action mapping of the user-account to determine a first action that corresponds to the first context, wherein the context-to-action mapping maps a plurality of contexts to a plurality of corresponding actions such that the first context maps to the first action;
   initiating the first action;
   after initiating the first action, receiving a data signal corresponding to a user-action;
   analyzing the data signal to determine a feedback relationship between the user-action and the first action; and
   based at least in part on the feedback relationship, updating the context-to-action mapping of the user-account.

2. The method of claim 1, wherein the context-to-action mapping indicates a conditional probability that the first action is correct when the second context signal is detected, given that the first context signal is also detected.

3. The method of claim 2, further comprising making a determination to initiate the first action, wherein the determination is based at least in part on the conditional probability.

4. The method of claim 2, wherein updating the context-to-action mapping comprises updating the conditional probability.

5. The method of claim 1, wherein analyzing the data signal to determine the feedback relationship between the user-action and the first action comprises carrying out a machine-learning process based at least in part on the user-action and the first action.

6. The method of claim 1, wherein analyzing the data signal to determine the feedback relationship comprises determining that the user-action implicitly confirms that the first action was correct in the first context.

7. The method of claim 1, wherein analyzing the data signal to determine the feedback relationship comprises determining that the user-action implicitly indicates that the first action was incorrect in the first context.

8. The method of claim 1, wherein analyzing the data signal to determine the feedback relationship comprises determining that the user-action implicitly indicates that the first action is less likely to be correct in the first context.

9. The method of claim 8, wherein the context-to-action mapping includes a likelihood indication that indicates a likelihood that the first action is correct in the first context, and wherein updating the context-to-action mapping comprises adjusting the likelihood indication to indicate a reduced likelihood that the first action is correct in the first context.

10. The method of claim 1, wherein analyzing the data signal to determine the feedback relationship comprises determining that the user-action implicitly indicates that the first action is more likely to be correct in the first context.

11. The method of claim 10, wherein the context-to-action mapping includes a likelihood indication that indicates a likelihood that the first action is correct in the first context, and wherein updating the context-to-action mapping comprises adjusting the likelihood indication to indicate an increased likelihood that the first action is correct in the first context.

12. The method of claim 1, wherein the user-action comprises an action that is dependent, at least in part, on the first action, the method further comprising:
   determining, based at least in part on the feedback relationship, that the first action is correct in the first context or is more likely to be correct in the first context.

13. The method of claim 1, wherein the user-action comprises an action that at least in part cancels the first action, the method further comprising:
   determining, based at least in part on the feedback relationship, that the first action is not correct in the first context or is less likely to be correct in the first context.

14. The method of claim 1, wherein the first action comprises an action that prompts a user-interaction, wherein the user-action comprises a lack of the user-interaction, the method further comprising:
   determining, based at least in part on the feedback relationship, that the first action is not correct in the first context or is less likely to be correct in the first context.

15. The method of claim 1, wherein the first action comprises an action that prompts a user-interaction, wherein the user-action comprises an occurrence of the user-interaction, the method further comprising:
   determining, based at least in part on the feedback relationship, that the first action is correct in the first context or is more likely to be correct in the first context.

16. The method of claim 1, wherein the two or more context signals comprise two or more of the following: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with the user-profile, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a device, (v) items that are currently detected by a device, (w) items that have been detected in the past by the device, (x) items that other devices associated with a device are currently in communication with or have communicated with in the past, (y) information derived from cross-referencing any two or more of: information on a user's calendar, information available via a user's social networking account, and/or other context signals or sources of context information, (z) health statistics or characterizations of a user's current health, and (aa) a user's recent context as determined from sensors on or near the user and/or other sources of context information.

17. The method of claim 1, wherein the first action comprises a home-automation action, and wherein initiating the first action comprises sending an instruction message to at least one home electronic device.

18. The method of claim 17, wherein the at least one home electronic device comprises at least one of the following: (a) a home appliance, (b) a refrigerator, (c) a microwave, (d) a dishwasher, (e) a freezer, (f) a washer, (g) a dryer, (h) a combination washer and dryer, (i) a television, (j) a home stereo unit, (k) a laptop computer, (l) a desktop computer, (m) a tablet computer, (n) a smartphone, (o) a garage door opener, (p) a home security system, (q) a home-automation control system, (r) a heating appliance, (s) a cooling appliance, and (t) a cooking appliance.

19. The method of claim 17, wherein the first action comprises an action that adjusts a user-interface of the at least one home-electronic device.

20. The method of claim 1, wherein the first action comprises at least one calendar action.

21. The method of claim 20, wherein the at least one calendar action comprises at least one of the following: (a) creating a calendar entry, (b) deleting an existing calendar entry, (c) updating an existing calendar entry, (d) setting a reminder for a calendar entry, (e) creating a meeting entry, (f) deleting an existing meeting entry, (g) updating an existing meeting entry, (h) sending one or more invitations for a meeting entry, (i) withdrawing one or more invitations for a meeting entry, (j) setting a reminder for a meeting entry, (k) creating a task entry, (l) deleting a task entry, (m) updating a task entry, and (n) setting a reminder for a task entry.

22. The method of claim 1, wherein the first action comprises an adjustment to a user-interface of the computing device.

23. The method of claim 1, wherein the first action comprises a non-content action.

24. A computer-implemented method comprising:
detecting at least one context signal;
determining, at a computing device, a first context based on the at least one context signal;
using a context-to-action mapping to determine a first action that corresponds to the first context, wherein the context-to-action mapping maps a plurality of contexts to a plurality of corresponding actions such that the at least one context signal maps to the first action;
initiating the first action;
after initiating the first action, receiving a data signal corresponding to a user-action;
analyzing the data signal to determine a feedback relationship between the user-action and the first action, wherein the feedback relationship indicates a desirability difference between the initiation of the first action and one or more previous initiations of the first action in a substantially same context;
responsive to the feedback, determining one or more context signals that have a likelihood of reconciling the desirability difference between the initiation of the first action and one or more previous initiations of the first action in a substantially same context; and
updating the context-to-action mapping of the user-account to indicate that the first context should be determined based on both: (a) the at least one context signal and (b) the one or more context signals that have a likelihood of reconciling the desirability difference.

25. The method of claim 24, wherein determining the one or more context signals that have a likelihood of reconciling the desirability difference comprises analyzing data from a historical context-to-action database to determine the one or more context signals that have a likelihood of reconciling the desirability difference between the initiation of the first action and one or more previous initiations of the first action in a substantially same context.

26. The method of claim 24, wherein determining the one or more context signals that have a likelihood of reconciling the desirability difference comprises initiating a prompt for input data to determine the one or more context signals that have a likelihood of reconciling the desirability difference between the initiation of the first action and one or more previous initiations of the first action in a substantially same context.

27. A system comprising:
a non-transitory computer-readable medium; and
program instructions stored on the non-transitory computer-readable medium and executable by at least one processor to:
determine a first context of a user-account based on a combination of two or more context signals corresponding to the user-account, the two or more context signals including a first context signal and a second context signal, wherein the first context comprises a data-based description or characterization of an environment or state that is associated with the user-account;
use a context-to-action mapping of the user-account to determine a first action that corresponds to the first context, wherein the context-to-action mapping maps a plurality of contexts to a plurality of corresponding actions such that the first context maps to the first action;
initiate the first action;
after initiating the first action, receive a data signal corresponding to a user-action;
analyze the data signal to determine a feedback relationship between the user-action and the first action; and
based at least in part on the feedback relationship, update the context-to-action mapping of the user-account.

28. The system of claim 27, wherein the context-to-action mapping indicates a conditional probability that the first action is correct when the second context signal is detected, given that the first context signal is also detected.

29. The system of claim 27, further comprising program instructions stored on the non-transitory computer-readable medium and executable by at least one processor to condition the initiation of the first action on a determination as to whether or not to initiate the first action, wherein the determination is based at least in part on the conditional probability.

30. The system of claim 27, wherein the update of the context-to-action mapping includes an adjustment of the conditional probability.

31. The system of claim 27, further comprising program instructions stored on the non-transitory computer-readable medium and executable by at least one processor to carry out a machine-learning process to determine a feedback relationship between the user-action and the first action, wherein the machine-learning process is based at least in part on the user-action and the first action.

32. The system of claim 27, wherein the feedback relationship comprises an implicit indication as to whether or not the user-action is correct in the first context.

33. The system of claim 27, wherein the feedback relationship comprises an implicit indication as to whether the user-action is more or less likely to be correct in the first context.

34. The system of claim 33:
wherein the context-to-action mapping includes a likelihood indication that indicates a likelihood that the first action is correct in the first context;
wherein, if the implicit indication indicates that the user-action is more likely to be correct, then the update of the context-to-action mapping includes an adjustment of the likelihood indication to indicate an increased likelihood that the first action is correct in the first context; and
wherein, if the implicit indication indicates that the user-action is less likely to be correct, then the update of the context-to-action mapping includes an adjustment of the likelihood indication to indicate a reduced likelihood that the first action is correct in the first context.

35. The system of claim 27, wherein the two or more context signals comprise two or more of the following: (a) a current time, (b) a current date, (c) a current day of the week, (d) a current month, (e) a current season, (f) a time of a future event or future context, (g) a date of a future event or future context, (h) a day of the week of a future event or future context, (i) a month of a future event or future user-context, (j) a season of a future event or future context, (k) a time of a past event or past context, (l) a date of a past event or past context, (m) a day of the week of a past event or past context, (n) a month of a past event or past context, (o) a season of a past event or past context, (p) ambient temperature, (q) a current, future, or past weather forecast at a current location, (r) a current, future, or past weather forecast at a location of a planned event, (s) a current, future, or past weather forecast at or near a location of a previous event, (t) information on a calendar associated with the user-profile, such as information regarding events or statuses of a user or a user's friends, (t) information accessible via a user's social networking account, such as information relating a user's status, statuses of a user's friends in a social network group, and/or communications between the user and the users friends, (u) noise level or any recognizable sounds detected by a device, (v) items that are currently detected by a device, (w) items that have been detected in the past by the device, (x) items that other devices associated with a device are currently in communication with or have communicated with in the past, (y) information derived from cross-referencing any two or more of: information on a user's calendar, information available via a user's social networking account, and/or other context signals or sources of context information, (z) health statistics or characterizations of a user's current health, and (aa) a user's recent context as determined from sensors on or near the user and/or other sources of context information.

36. The system of claim 27, wherein the first action comprises a home-automation action, and wherein the first action comprises sending an instruction message at least one a home electronic device.

37. The system of claim 36, wherein the at least one home electronic device comprises at least one of the following: (a) a home appliance, (b) a refrigerator, (c) a microwave, (d) a dishwasher, (e) a freezer, (f) a washer, (g) a dryer, (h) a combination washer and dryer, (i) a television, (j) a home stereo unit, (k) a laptop computer, (l) a desktop computer, (m) a tablet computer, (n) a smartphone, (o) a garage door opener, (p) a home security system, (q) a home-automation control system, (r) a heating appliance, (s) a cooling appliance, and (t) a cooking appliance.

38. The system of claim 27, wherein the first action comprises at least one calendar action.

39. The system of claim 38, wherein the at least one calendar action comprises at least one of the following: (a) creating a calendar entry, (b) deleting an existing calendar entry, (c) updating an existing calendar entry, (d) setting a reminder for a calendar entry, (e) creating a meeting entry, (f) deleting an existing meeting entry, (g) updating an existing meeting entry, (h) sending one or more invitations for a meeting entry, (i) withdrawing one or more invitations for a meeting entry, (j) setting a reminder for a meeting entry, (k) creating a task entry, (l) deleting a task entry, (m) updating a task entry, and (n) setting a reminder for a task entry.

40. The system of claim 27, wherein the first action comprises an adjustment to a user-interface of the computing device.

41. A system comprising:
a means for determining a first context of a user-account based on a combination of two or more context signals corresponding to the user-account, wherein the first context comprises a data-based description or characterization of an environment or state that is associated with the user-account;
a means for using a context-to-action mapping of the user-account to determine a first action that corresponds to the first context, wherein the context-to-action mapping maps a plurality of contexts to a plurality of corresponding home-automation actions, such that the first context maps to the first action;
a means for initiating the first action;
a means for, after initiating the first action, receiving a data signal corresponding to a user-action;
a means for, analyzing the data signal to determine a feedback relationship between the user-action and the first action; and
a means for, based at least in part on the feedback relationship, updating the context-to-action mapping of the user-account.

42. A computer-implemented method comprising:
determining a first context signal corresponding to a user-account, wherein the first context signal provides information related to an environment or state that is associated with the user-account;
determining a second context signal corresponding to the user-account, wherein the second context signal provides information related to an environment or state that is associated with the user-account;
using a context-to-action mapping of the user-account to determine a first action that corresponds to a combination of the first context signal and the second context signal, wherein the context-to-action mapping maps a plurality of context-signal combinations to a plurality of corresponding actions such that the combination of the first context signal and the second context signal maps to the first action;

initiating the first action;

after initiating the first action, receiving a data signal corresponding to a user-action;

analyzing the data signal to determine a feedback relationship between the user-action and the first action; and based at least in part on the feedback relationship, updating the context-to-action mapping of the user-account.

43. A computer-implemented method comprising:

detecting at least one context signal;

determining, at a computing device, a first context based on the at least one context signal;

using a context-to-action mapping to determine a first action that corresponds to the first context, wherein the context-to-action mapping maps a plurality of contexts to a plurality of corresponding actions such that the at least one context signal maps to the first action;

initiating the first action;

after initiating the first action, receiving a data signal corresponding to a user-action;

analyzing the data signal to determine a feedback relationship between the user-action and the first action, wherein the feedback relationship indicates a desirability difference between the initiation of the first action and one or more previous initiations of the first action in a substantially same context;

responsive to the feedback, initiating a prompt for input data to determine one or more context signals that have a likelihood of reconciling the desirability difference between the initiation of the first action and one or more previous initiations of the first action in a substantially same context; and updating the context-to-action mapping to indicate that the first context should be determined based on both: (a) the at least one context signal and (b) the one or more context signals that have a likelihood of reconciling the desirability difference.

* * * * *